US011386334B2

(12) United States Patent
Yanosy, Jr. et al.

(10) Patent No.: US 11,386,334 B2
(45) Date of Patent: Jul. 12, 2022

(54) CASE-BASED REASONING SYSTEMS AND METHODS

(71) Applicant: KPMG LLP, New York, NY (US)

(72) Inventors: John A. Yanosy, Jr., Grapevine, TX (US); Christopher Wicher, Raleigh, NC (US); Anuj Khanna, New York, NY (US)

(73) Assignee: KPMG LLP, New York, NY (US)

( * ) Notice: Subject to any disclaimer, the term of this patent is extended or adjusted under 35 U.S.C. 154(b) by 613 days.

(21) Appl. No.: 16/255,681

(22) Filed: Jan. 23, 2019

(65) Prior Publication Data

US 2020/0234148 A1    Jul. 23, 2020

(51) Int. Cl.
*G06F 3/0481*    (2022.01)
*G06N 5/02*    (2006.01)

(52) U.S. Cl.
CPC ........................ *G06N 5/02* (2013.01)

(58) Field of Classification Search
CPC ........... G06N 5/02; G06N 5/04; G06F 3/0481
See application file for complete search history.

(56) References Cited

U.S. PATENT DOCUMENTS

| 7,069,260 | B2 | 6/2006 | Yanosy |
| 7,571,149 | B1 | 8/2009 | Yanosy, Jr. |
| 7,644,052 | B1 | 1/2010 | Chang et al. |
| 8,015,136 | B1* | 9/2011 | Baker .................... G16H 10/60 706/45 |
| 8,117,147 | B1* | 2/2012 | Rubin ...................... G06N 5/04 706/47 |
| 8,631,048 | B1 | 1/2014 | Davis et al. |
| 8,655,882 | B2 | 2/2014 | Kretz et al. |
| 8,849,860 | B2 | 9/2014 | Ilyas et al. |
| 9,892,029 | B2 | 2/2018 | Chappalgaon et al. |
| 2007/0027874 | A1* | 2/2007 | Stoffel .................. G06F 16/258 |
| 2010/0057645 | A1* | 3/2010 | Lauritsen ............... G06N 5/042 706/11 |
| 2010/0088320 | A1* | 4/2010 | Fortier ................... G06Q 10/00 707/746 |
| 2010/0228782 | A1 | 9/2010 | Rao et al. |
| 2011/0040720 | A1* | 2/2011 | Zangwill .................. G06N 5/04 706/52 |
| 2012/0102050 | A1 | 4/2012 | Button et al. |

(Continued)

FOREIGN PATENT DOCUMENTS

KR    10-1301077 B1    9/2013

OTHER PUBLICATIONS

Shokouhi et al., "An overview of case-based reasoning applications in drilling engineering", Artif Intell Rev, DOI 10.107/s10462-011-9310-2, Published online Jan. 3, 2012, 13 pp.

(Continued)

*Primary Examiner* — Phenuel S Salomon
(74) *Attorney, Agent, or Firm* — Hunton Andrews Kurth LLP

(57) ABSTRACT

Systems and methods disclosed herein provide for a case-based reasoning using universal ontologies. Embodiments of the systems and methods provide for comparing current and past cases based on the universal ontologies, wherein the universal ontology integrates information associated with the current and past cases with at least one reasoning system.

18 Claims, 28 Drawing Sheets

(56) References Cited

U.S. PATENT DOCUMENTS

| | | | | |
|---|---|---|---|---|
| 2012/0310947 | A1* | 12/2012 | Fortier | G06Q 10/00 |
| | | | | 707/741 |
| 2014/0052680 | A1* | 2/2014 | Nitz | G06N 5/04 |
| | | | | 706/46 |
| 2014/0280370 | A1* | 9/2014 | Oberle | G06F 8/51 |
| | | | | 707/803 |
| 2015/0286969 | A1* | 10/2015 | Warner | G06Q 10/0633 |
| | | | | 705/7.27 |
| 2016/0179979 | A1 | 6/2016 | Aasman et al. | |
| 2016/0180438 | A1 | 6/2016 | Boston et al. | |
| 2017/0046425 | A1 | 2/2017 | Tonkin et al. | |
| 2017/0270197 | A1 | 9/2017 | Miracolo et al. | |
| 2018/0189284 | A1 | 7/2018 | Hosabettu | |
| 2021/0042635 | A1* | 2/2021 | Li | G06F 40/30 |

OTHER PUBLICATIONS

Stanford Encyclopedia of Philosophy, "Classical Logic", 18 pages, retrieved from the Internet Archive WayBack Machine <https://web.archive.org/web/20170911192934/https://plato.stanford.edu/entries/logic-classical/> on Nov. 19, 2019.

Stanford Encyclopedia of Philosophy, "First-order Model Theory", 11 pages, retrieved from the Internet Archive WayBack Machine <https://web.archive.org/web/20170911112635/https://plato.stanford.edu/entries/modeltheory-fo/> on Nov. 19, 2019.

W3C, Web Page <https://www.w3.org/>, 8 pages, retrieved from the Internet Archive WayBack Machine <https://web.archive.org/web/20170901030538/http://www.w3.org/TR/owl2-overview/> on Nov. 19, 2019.

W3C, Web Page <https://www.w3.org/>, 12 pages, retrieved from the Internet Archive WayBack Machine <https://web.archive.org/web/20170818180515/http://www.w3.org/TR/2012/REC-owl2-direct-semantics-20121211/> on Nov. 21, 2019.

W3C, Web Page <https://www.w3.org/>, 3 pages, retrieved from the Internet Archive WayBack Machine <https://web.archive.org/web/20170901153725/http://www.w3.org/2004/02/skos/> on Nov. 21, 2019.

W3C, Web Page <https://www.w3.org/>, 3 pages, retrieved from the Internet Archive WayBack Machine <https://web.archive.org/web/2017101250303/https://www.w3.org/TR/skos-reference/skos-xl.html> on Nov. 21, 2019.

W3C, Web Page <https://www.w3.org/>, 101 pages, retrieved from the Internet Archive WayBack Machine <https://web.archive.org/web/20170926013937/http://www.w3.org/TR/xmlschema-2/> on Nov. 21, 2019.

W3C, Web Page <https://www.w3.org/>. 43 pages, retrieved from the Internet Archive WayBack Machine <https://web.archive.org/web/20170912032346/http://www.w3.org/TR/2009/REC-skos-reference-20090818/> on Dec. 20, 2019.

Ontology Alignment Evaluation Initiative, Web Page <http://.oaei.ontologymatching.org>, 2 pages, retrieved from the Internet Archive WayBack Machine <https://web.archive.org/web/20170929064317/http://oaei.ontologymatching.org/> on Nov. 21, 2019.

OSF Wiki, Web Page <http://wiki.opensemanticframework.org/index.php/Main_Page>, 1 page, retrieved from the Internet Archive WayBack Machine <https://web.archive.org/web/20170113104329/http://wiki.opensemanticframework.org/index.php/Common_External_Ontologies> on Nov. 21, 2019.

OSF Wiki, Web Page <http://wiki.opensemanticframework.org/index.php/>, 9 pages, retrieved from the Internet Archive WayBack Machine <https://web.archive.org/web/20171003091901/http://wiki.opensemanticframework.org/index.php/Lightweight_Domain_Ontologies_Development_Methodology> on Nov. 21, 2019.

Sanchez, Elaboration of Controlled Vocabularies Using SKOS, SKOS Workshop, DCMI Global Meetings & Conferences, DC-2015, São Paulo, Brazil, retrieved from <dcevents.dublincore.org/IntConf/dc-2015/paper/view/File/404/464>, 73 pp, Sep. 2015.

Tao et al, Terminology Representation Guidelines for Biomedical Ontologies in the Semantic Web Notations, <https://www.ncbi.nlm.nih.gov/pmc/articles/PMC3563768/> 29 pp, Feb. 2013.

Wyner et al., "Argument Schemes for Legal Case-based Reasoning", Proceedings of the 2007 Conference on Legal Knowledge and Information Systems: JURIX 2007: The Twentieth Annual Conference, pp. 139-149.

* cited by examiner

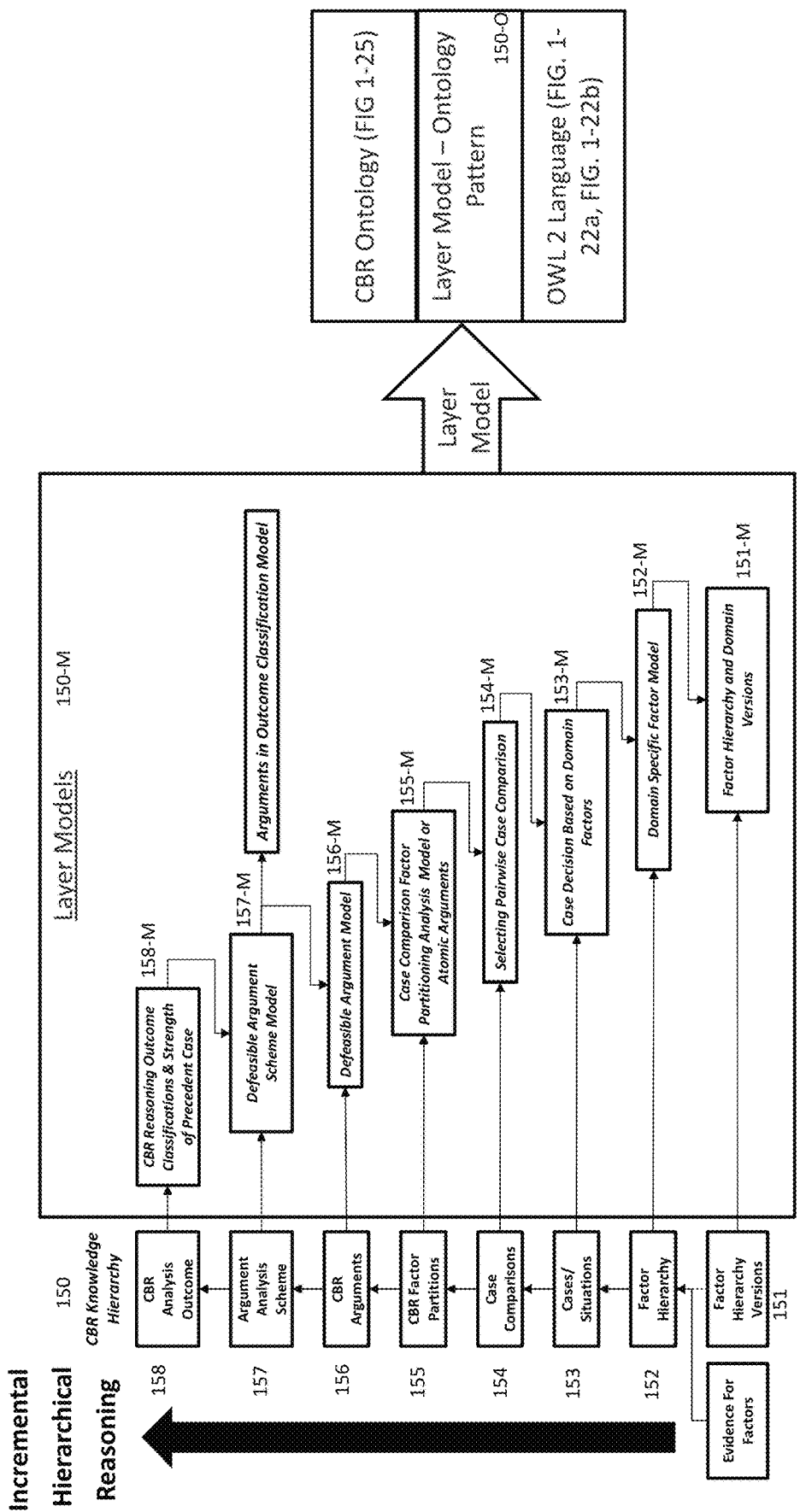

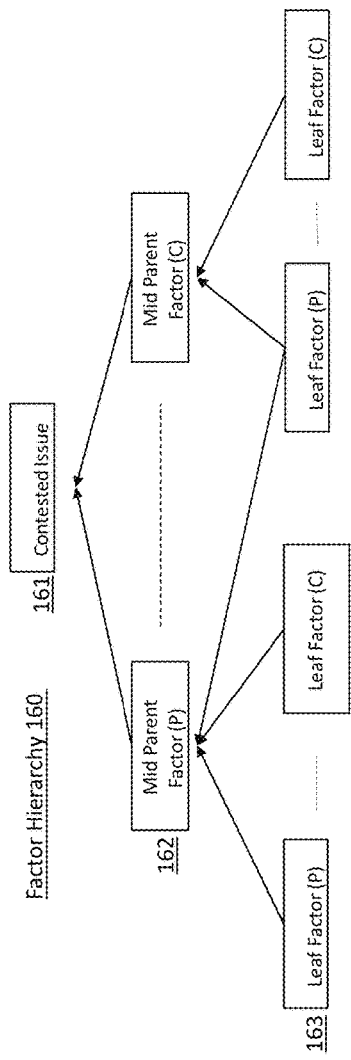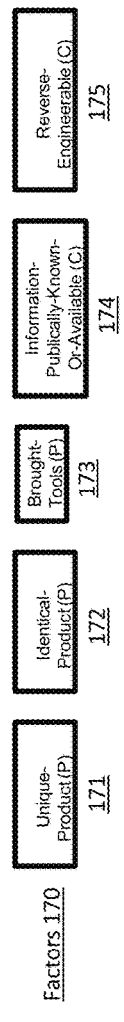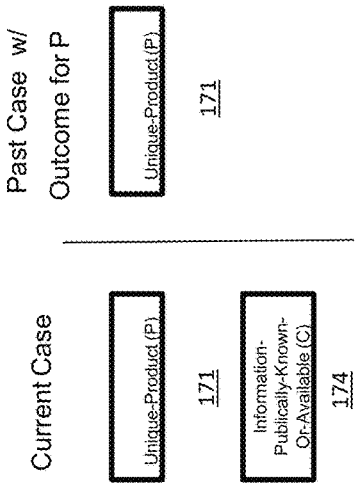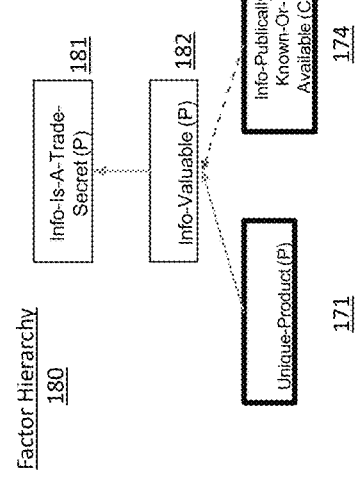

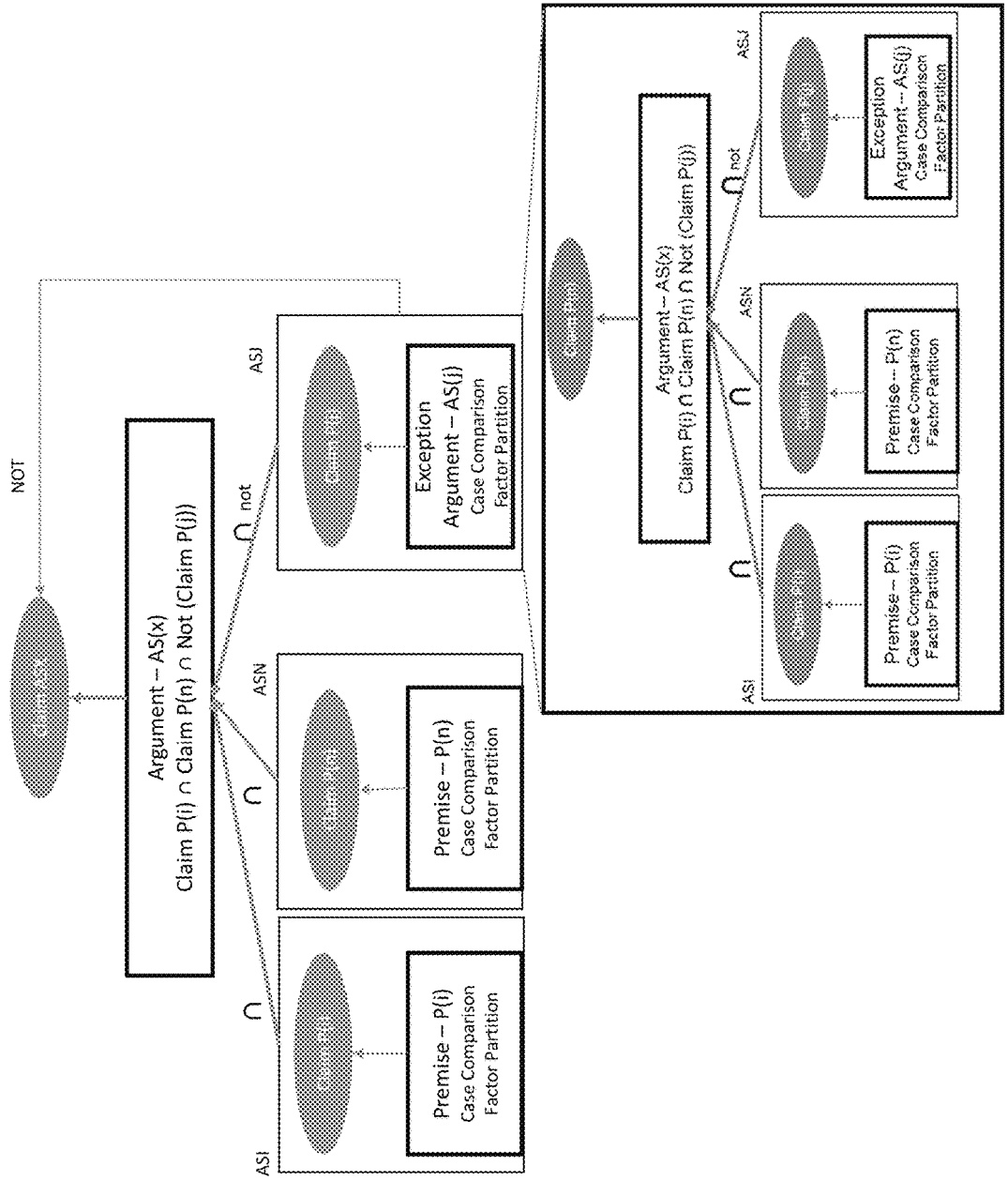
FIG. 4C1

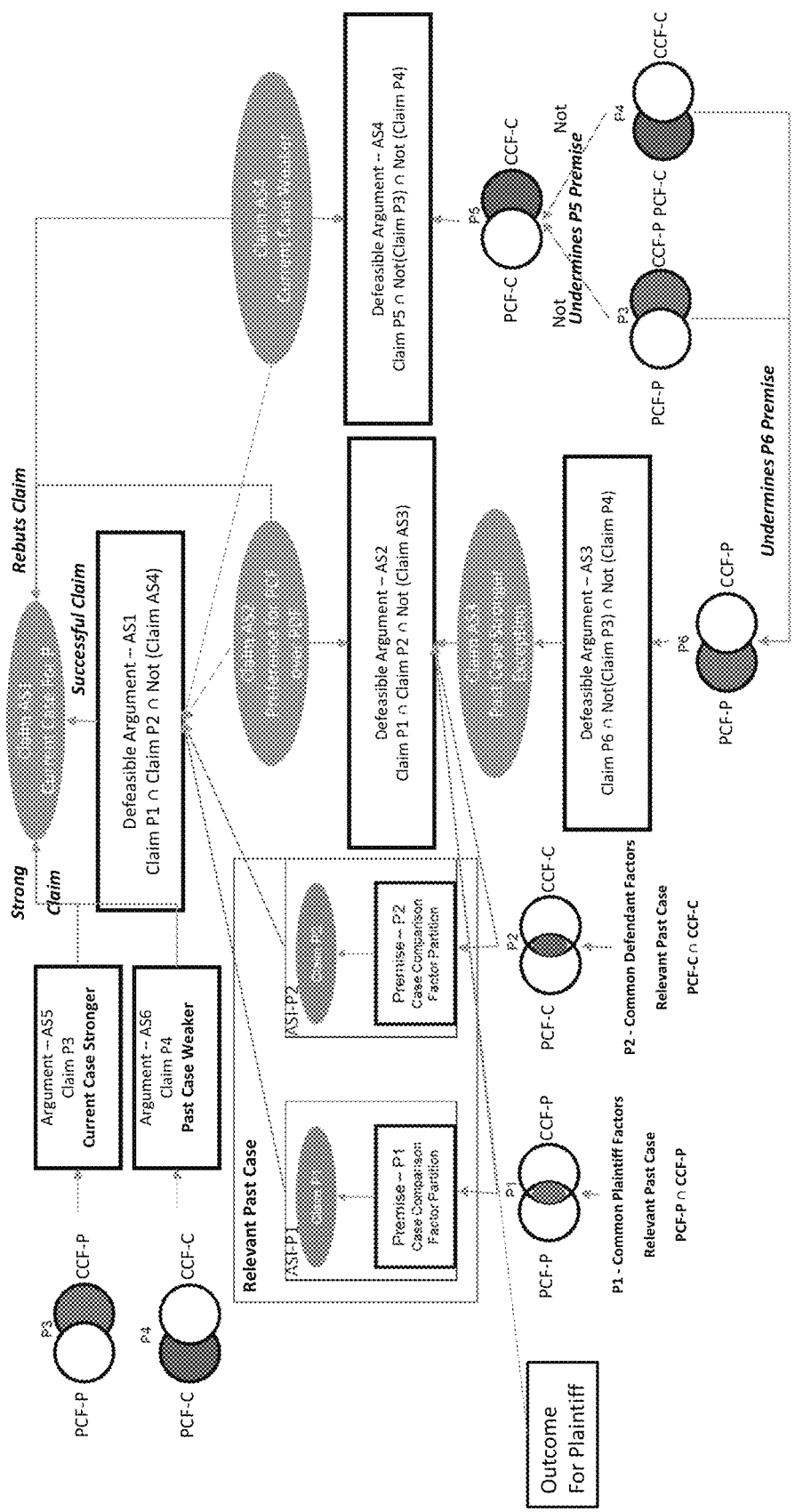
FIG. 4C2

| Factor | Side | Factor Name | Factor Parent |
|---|---|---|---|
| lgc:F1 | lgc:C | Disclosure-In-Negotiations | lgc:F102 |
| lgc:F10 | lgc:C | Secrets-Disclosed-To-Outsiders | lgc:F105 |
| lgc:F12 | lgc:P | Outsider-Disclosures-Restricted | lgc:F105 |
| lgc:F15 | lgc:P | Unique-Product | lgc:F104 |
| lgc:F2 | lgc:P | Bribed-Employee | lgc:F111 |
| lgc:F25 | lgc:C | Information-Reverse-Engineered | lgc:F111 |
| lgc:F26 | lgc:P | Used-Deception | lgc:F111 |
| lgc:F27 | lgc:C | Disclosure in Public Forum | lgc:F105 |

FIG. 5C

| Case | Case Factors |
|---|---|
| lgc:Announce | lgc:F27, lgc:F15, lgc:F1 |
| lgc:Bribe | lgc:F1, lgc:F15, lgc:FVPC, lgc:F2 |
| lgc:Bribe2 | lgc:F25, lgc:F2, lgc:F15, lgc:F1 |
| lgc:Deceit | lgc:F26, lgc:F1, lgc:F15 |
| lgc:Disclose | lgc:F15, lgc:F10, lgc:F1 |
| lgc:Restrict | lgc:F12, lgc:F15, lgc:F10, lgc:F1 |
| lgc:Reverse | lgc:F1, lgc:F15, lgc:F25 |
| lgc:Vanilla | lgc:F15, lgc:F1 |

FIG. 5D

| CC/PC | P1 | P2 | P3 | P4 | P5 | P6 |
|---|---|---|---|---|---|---|
| Announce/Disclose | F15 | F1 | | F10 | F27 | |
| Bribe/Vanilla | F15 | F1 | F2 | | | |
| Deceipt/Bribe | F15 | F1 | F26 | | | F2 |
| Disclose/Vanilla | F15 | F1 | | | F10 | |
| Restrict/Vanilla | F15 | F1 | F12 | | F10 | |
| Vanilla/Bribe | F15 | F1 | | | | F2 |
| Vanilla/Reverse | F15 | F1 | | F25 | | |

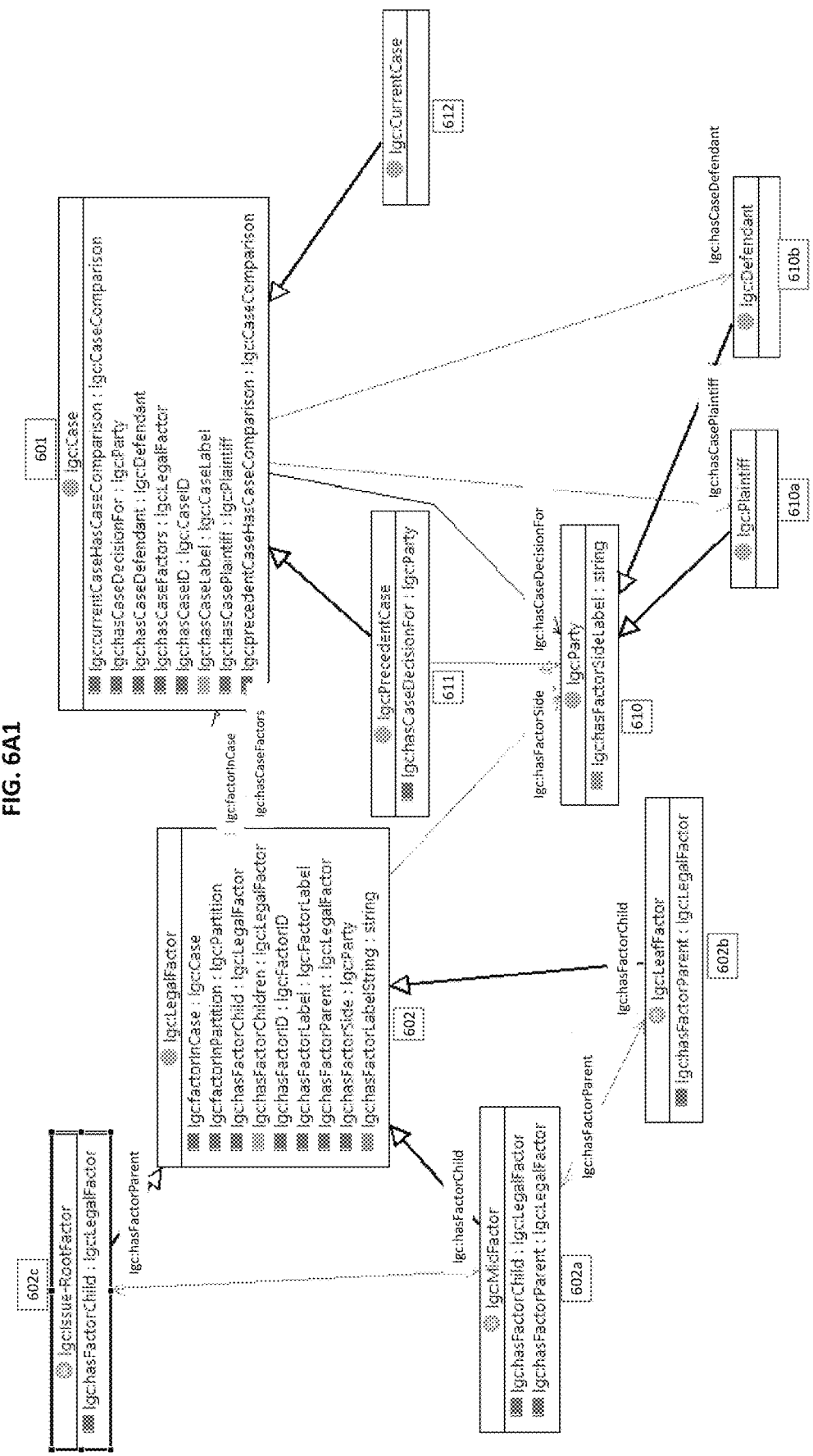
FIG. 6A1

FIG. 6A2
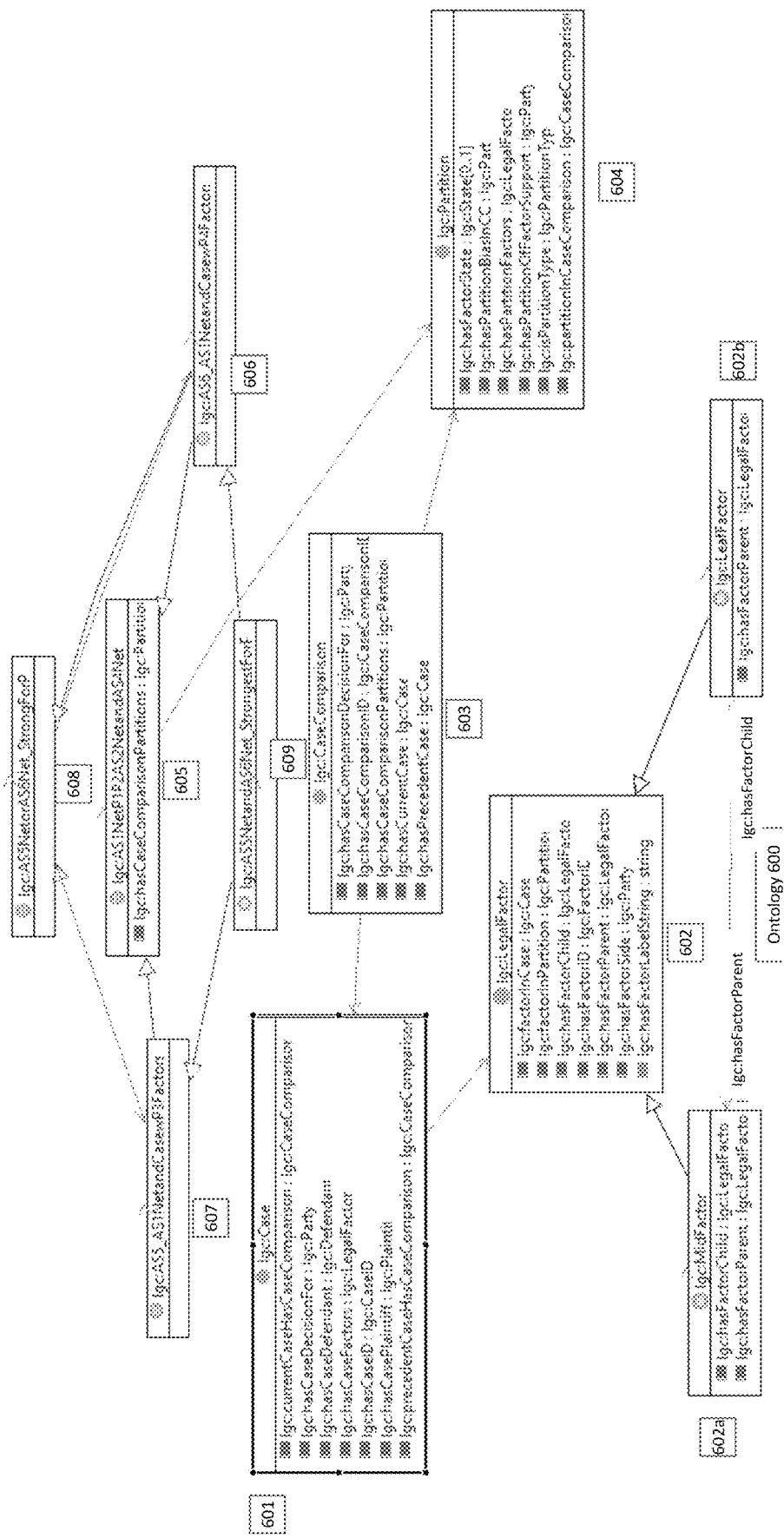

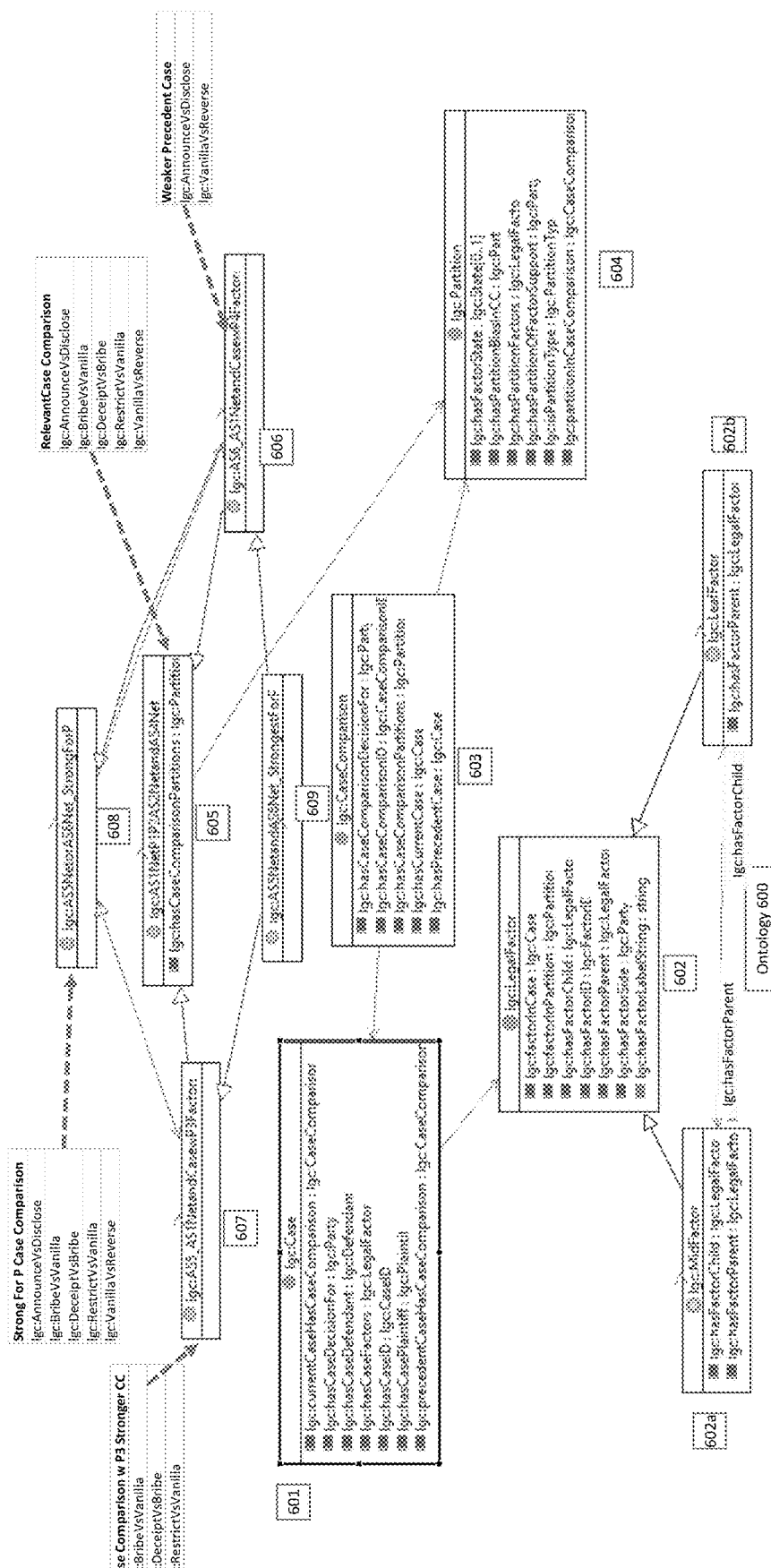
FIG. 6A3

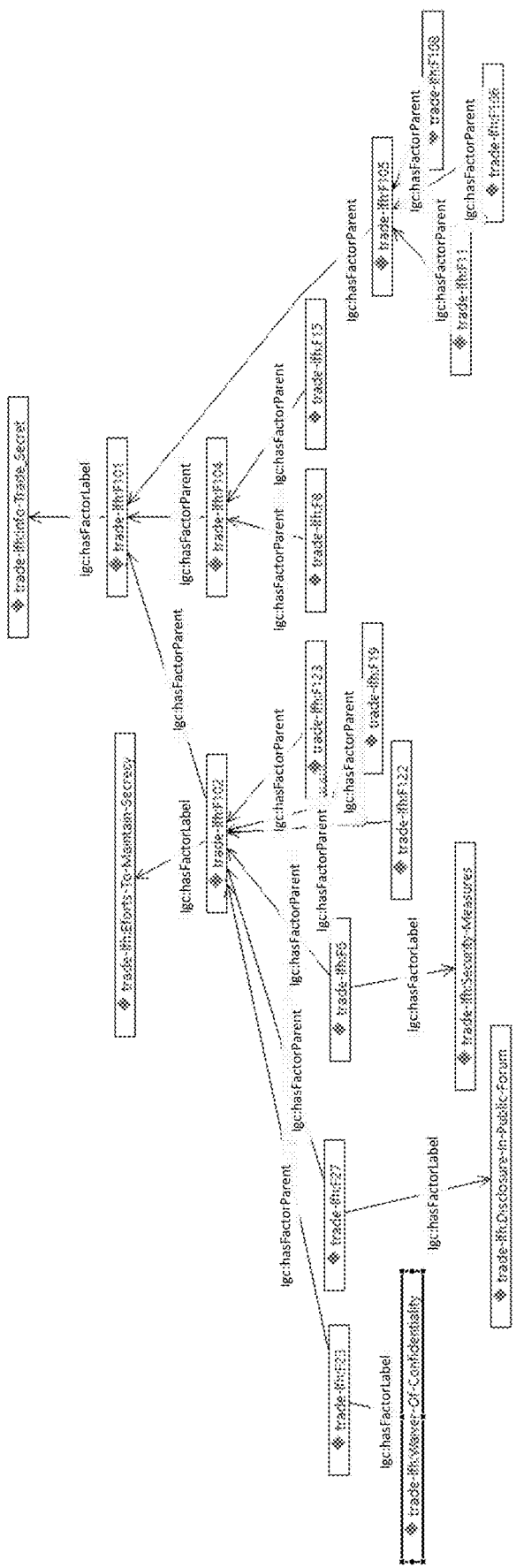
FIG. 6A4

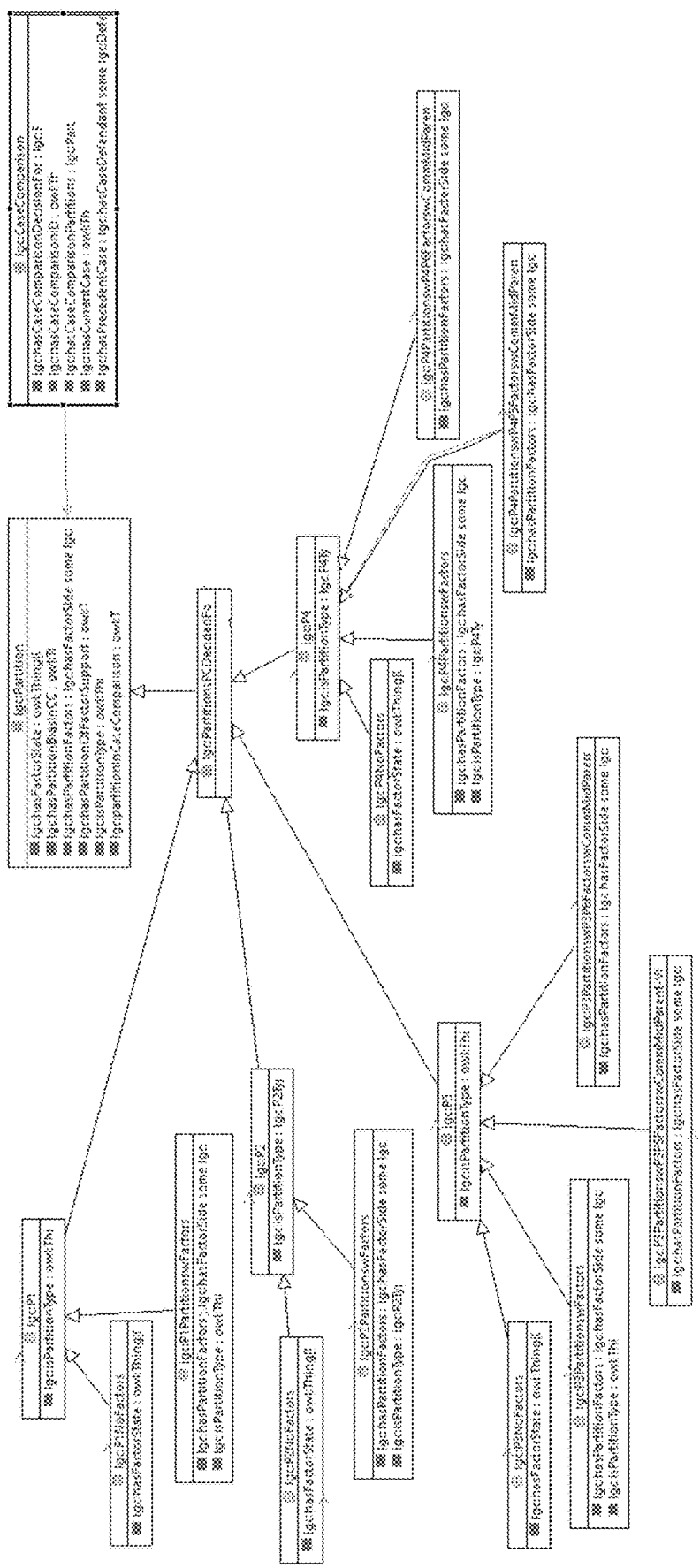
FIG. 6F1

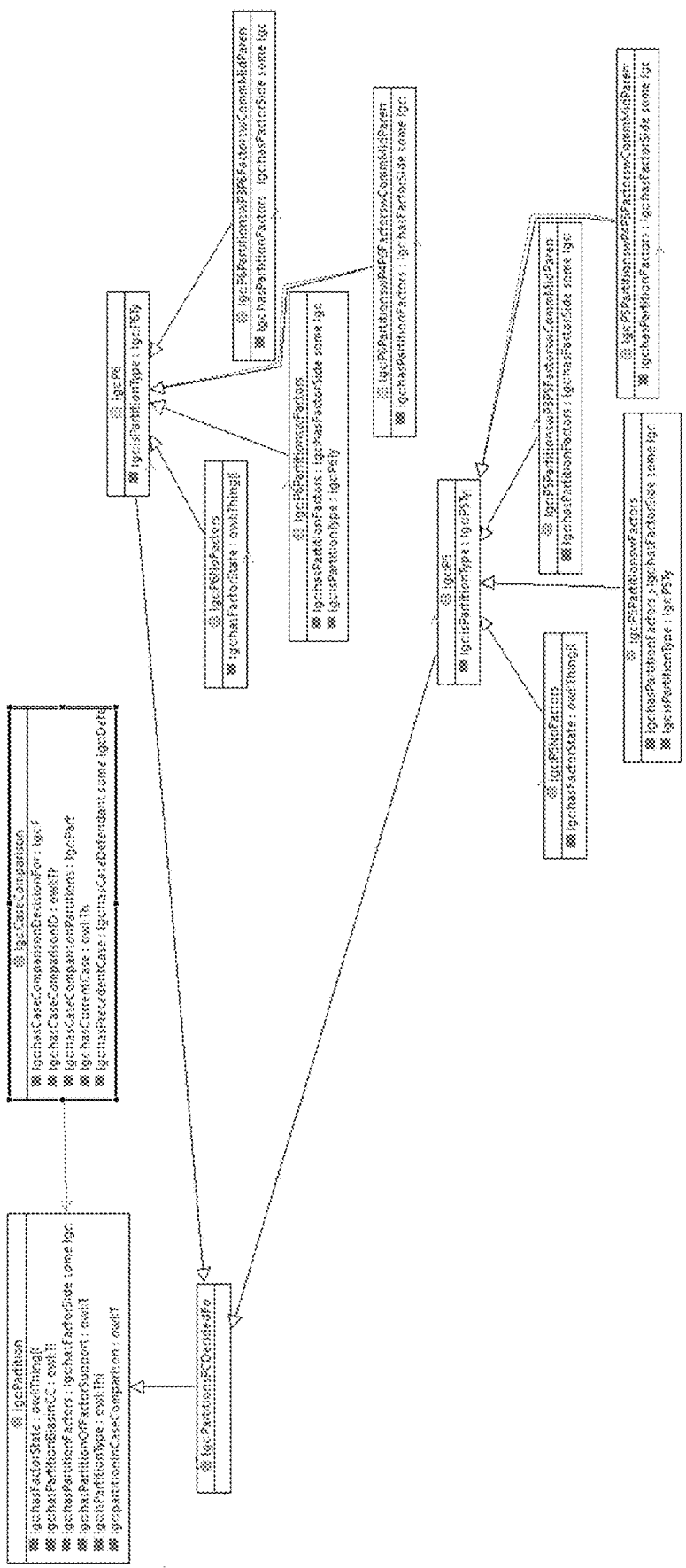
FIG. 6F2

FIG. 7A

Output Display Selection

CASE
- Case Date
- Case Decision
- Case Factors
- Case Authority
- Case Decision
- Case Contested Issue FACTOR
- Factor Description
- Factor Bias
- Factor Name
- Factor ID CBR Outcome
- CBR Case Classification
- Discriminating Strong Factor
- Discriminating Week Factor
- Common Factors
- Recommended Factors CBR Drill Down -- Per Past Case Analysis
- P1-P6 Factor Partitions
- Cases No Discriminating Exceptions
- Cases Exceptions Mitigated
- AS3 Exceptions
- AS4 Exceptions

- Cases – No Common Factors
- Stronger Past Cases
- Weaker Past Cases
- Stronger Current Case CBR Statistical Metrics
- Cases w Most Common Factors
- Distribution of Case Common Factors
- Distribution of Each Partition P1-P6
- Average, Std Dev of P1-P6 Distributions

| Filters | Past Case | Dates | Argument Strength Classification | Strongest Factors | Strong Factors | Relevant Common Factors | Recommended Factors |
|---|---|---|---|---|---|---|---|
| Dates Range | | | | | | | |
| 01/01/2018  01/01/2018 | | | | | | | |
| Current Case/Situation | | | | | | | |
| Case XXX | | | | | | | |
| Comparison Strength | | | | | | | |
| Strongest | | | | | | | |
| Strong | | | | | | | |
| Relevant | | | | | | | |
| Non-Relevant | | | | | | | |
| Factors | | | | | | | |
| F1-Public Available Inf | | | | | | | |
| F2 – Tests for Unknown Inf | | | | | | | |
| Post Outcomes | | | | | | | |
| Pro | | | | | | | |
| Con | | | | | | | |

| Factor Selection | Current Case | Case Comparison | Strongest | Strong | Relevant | Not Relevant | P1 | P2 | P3 | P4 | P5 | P6 |
|---|---|---|---|---|---|---|---|---|---|---|---|---|
| F1 ☒ | | | | | | | | | | | | |
| F2 ☐ | | | | | | | | | | | | |
| F15 ☒ | | | | | | | | | | | | |
| F25 ☐ | | | | | | | | | | | | |

FIG. 7D

| Case | Factor ID | Factor Label | Bias (P, C) | Factor Parent |
|---|---|---|---|---|
| Announce ☒<br>Bribe ☐<br>Bribe2 ☐ | F1 ☒ | Disclosure in Negotiations | P ☒ | F102 ☒ |
| | F2 | Bribed Employee | C ☐ | F111 ☐ |
| | F15 | Unique Product | | |
| | F25 | Information Reverse Engineered | | |

CASE-BASED REASONING SYSTEMS AND METHODS

FIELD OF THE INVENTION

The present invention relates generally to information and computer science, and more particularly to improved case-based reasoning systems and methods.

BACKGROUND

Case-based reasoning (CBR) is defined as the branch of artificial intelligence (AI) concerned with solving problems by reuse of past experiences. CBR examines a current situation in terms of factors, when compared to a past situation and its decisions factors, where the occurrence of factors are used to make a decision about a contested issue. In particular, factors associated with past situations are analyzed and compared to factors associated with a same issue in the current situation. Specifically, factors supporting an argument for a similar decision of an issue in the current situation are identified in the past situations. Further, CBR also ranks these past situations according to the strength of their argument for a similar decision. The underlying assumption is that the past situation's decision for a contested issue was based on reasoning about the occurrence of a subset of "pro" and "con" factors, from a common set of domain factors that are normatively used to decide that issue. Each situation, either past or current, may have different subsets of occurrences of these factors, whose definitions have a common understanding of meaning known to the decision authorities and to the parties contesting the issue. In each situation, occurrences of these factors are used by the contesting parties to argue for a pro or con decision of a contested issue, wherein each factor has an inherent bias to be supportive of or against that pro or con decision. The decision authority then analyzes the factors and the arguments to render a decision.

Further, CBR can also be designed where, instead of past cases/situations being used for comparison purposes, a set of pre-defined prototypical situations are defined, where their factors and decisions are used for comparison purposes.

However, comparing factors from current cases to a number of past cases can be difficult and time-intensive if each of the cases and the corresponding factors for a contested issue are associated with different domains and models. In particular, current systems aren't able to efficiently integrate multiple kinds of knowledge to perform a comparison between a current case and the plurality of already-decided past cases. Further, current approaches generally utilize at least one of similarity measures of either attribute value-pairs or nearest-k neighbors (or other analytic sorting) to determine similarity of a past case with a current case. Such approaches are limited by relying on a single similarity analysis to determine the relevance of each local factor and relying on other similarity measures to provide a global similarity measure across the local attribute similarity measures. This form of comparative analysis has a number of weaknesses. For example, the analysis does not include any reasoning about factors relationships, nor provides any detailed explanatory rational for the reasoning results of its analysis. Further, the analysis does not use any arguments and counter arguments for the relevance determination of a factor in a decision. As such, there is a loss of information from this kind of similarity attribute-value case analysis. In fact, similarity-based CBR is only useful in finding those aspects of cases which are in common, not those aspects which are differentiating, and whether they support the defendant (i.e., "con") or plaintiff (i.e., "pro").

As such, there is a need for a system that combines multiple kinds of knowledge and multiple forms of inferential reasoning to justify the relevance and strength for selecting past cases.

SUMMARY

This invention focuses on reasoning about knowledge of past decisions for contested issues, and their influence for an argument for a similar decision for a current situation. According to an embodiment, a CBR system compares the population of past situations and compares factors for each past situation with the factors for a current situation using a hierarchical multi-layered reasoning model, wherein the model is implemented in a unique CBR ontology where the different kinds of reasoning associated with each layer's model filters the population of past situations, layer-by-layer, until a sorted list of past situations satisfying each layer's model is provided with CBR outcome argument strength classifications.

Further, the CBR system can use knowledge of any situation in its populated knowledge base for comparative reasoning with any other situation in its populated situation knowledge base, thereby providing additional insights about the support of other situation decisions. This approach also provides detailed CBR reasoning and rational about the strength of support for the same decision for a selected situation with other situations in the knowledge base. This approach can also be used further to analyze the supporting argumentative strength trail of past situation decisions for a current situation discovered by CBR reasoning, thereby providing a path of decisions for past situations that CBR discovered supporting the argument for a similar decision. This CBR analysis can be repeated iteratively to any number of iterations for each supporting past situation to form a tree structure of past situation decisions in the CBR knowledge base. This also enables the reasoning about the paths in the tree that have the highest argument outcome strength for a similar decision to the current situation.

Further, the CBR system is also designed to enable comparative reasoning between a current situation and past situations with a capability to select different combinations or subsets of factor occurrences for a current situation. This flexibility to select and assert subsets of factors for a current situation provides additional insights about which factor combinations for a current situation provide the best set of past cases with stronger arguments for arguing a similar decision for the current situation. Each execution of the CBR reasoning system will result in a sorted list of past situations organized by their strength of argument for a similar decision and, in this way, subsequent reasoning by the same system can automatically determine the best combination of factors.

Further, according to an embodiment, the CBR reasoning results provide a list of prototypical situations sorted by their argumentative strength for a similar decision. If the prototypical situations are organized in a hierarchy of preference relations, than the interpretation of the CBR reasoning results for a current situation may also be sorted by the preference relation of the prototypical situations.

According to an embodiment, the CBR system includes: a processor, wherein the processor is configured to: (i) receive, at a user interface, selection of a current case and at least one past case; (ii) compare the current case with the at least one past case based on an ontology, wherein the ontology integrates information associated with the at least one current case and the at least one past case with at least one reasoning system, wherein the comparison includes: determining (a) a first factor hierarchy for the current case and (b) at least a second factor hierarchy for the at least one past case, wherein each of the first factor hierarchy and the at least second factor hierarchy includes a plurality of corresponding factors; and applying the at least one reasoning system to the determined first factor hierarchy and at least second factor hierarchy, wherein the at least one reasoning system filters out those past cases failing to satisfy conditions associated with the at least one reasoning system; and (iii) display, with the user interface, those past cases satisfying the conditions associated with the at least one reasoning system.

According to another embodiment, the CBR system includes (i) at least one server, wherein the at least one server is configured to store a plurality of current and past cases and at least one reasoning system, (ii) a client device including a user interface, wherein the user interface is configured to receive selection of a current case and at least one past case of the plurality of current and past cases, and (iii) a processor, wherein the processor is configured to: (a) compare the current case with the at least one past case based on an ontology, wherein the ontology integrates information associated with the at least one current case and the at least one past case with the at least one reasoning system, wherein the comparison includes: determining a first factor hierarchy for the current case and at least a second factor hierarchy for the at least one past case, wherein each of the first factor hierarchy and the at least second factor hierarchy includes a plurality of corresponding factors; and applying the at least one reasoning system to the determined first factor hierarchy and at least second factor hierarchy, wherein the at least one reasoning system filters out those past cases failing to satisfy conditions associated with the at least one reasoning system; and (b) display, with the user interface, those past cases satisfying the conditions associated with the at least one reasoning system.

Further, according to an embodiment, a CBR method includes: receiving, at a user interface, selection of a current case and at least one past case; comparing the current case with the at least one past case based on the CBR ontology, wherein the ontology integrates information associated with the at least one current case and the at least one past case with at least one reasoning system, wherein the comparison includes: determining (i) a first factor hierarchy for the current case and (ii) at least a second factor hierarchy for the at least one past case, wherein each of the first factor hierarchy and the at least second factor hierarchy includes a plurality of corresponding factors; and applying the at least one reasoning system to the determined first factor hierarchy and at least second factor hierarchy, wherein the at least one reasoning system filters out those past cases failing to satisfy conditions associated with the at least one reasoning system; and displaying, with the user interface, those past cases satisfying the conditions associated with the at least one reasoning system.

According to an embodiment, the CBR system uses a semantically integrating knowledge-based approach, based on the design of a layered ontology multi-layered hierarchical knowledge representation and reasoning architecture to represent knowledge and reason about a current situation/case and the relevance of past situations/cases in determining whether a similar decision for the current situation outcome should occur. In particular, the system compares every past situation/case with the current situation and, through the ontology hierarchical reasoning system, analyzes the basis and rational for determining if a past situation/case can be used for a similar decision in the current situation. For example, the CBR system starts with first determining whether there are any common factors both for (i.e., "pro") and against (i.e., "con") the decision. Then, the system analyzes if there are any discriminating factors that prohibit the argument for a similar decision. It then attempts to mitigate this discrimination through an argument that undermines this discrimination by reasoning about the relationships in the factor hierarchy. The system then analyzes these results of the case comparison to see if there are any unique discriminating factors that strengthen the argument for a similar decision, i.e., factors that weaken the past case or factors that strengthen the current case. Then, the system classifies these results into those cases that have a minimum relevance of commonality with no or undermined discriminating negative factors, and classifies these into those that have strengthening factors in its argument reasoning. Further, all analyses of all past cases/situations results are explicitly retained by the system knowledge base and are available for querying by a user interface for explanatory reasons. The CBR system excludes past cases where there are unique discriminating weakening factors in the current situation/case or unique discriminating strengthening factors in the past case which are not undermined by other factors in the factor hierarchy. Further, because all of the reasoning results are retained in the knowledge system (even those that did not satisfy the minimal conditions for relevance), the CBR system can display these details for one or more selected past cases for considering editing of current case factors to change its CBR argument outcome classification.

The ability to reason about the parent-child relationships in the factor hierarchy in the combined current-past case factor hierarchy enables the CBR system to determine exactly the influence of discriminating factors and whether they lead to exceptions, removal of the past case for consideration, or whether they can be undermined by other factors having the same parent.

Further, the CBR system is domain independent. Therefore, CBR can be applied to different domains with their own sets of contested issues. Further, according to an embodiment, the CBR system is configured to reason about knowledge in lower architecture layers representing information about contested issues, relevant factors, and past cases/situations (and their factors and decisions) without having to have create specific information at the higher layers about this domain information in its layers. The CBR ontology at these lower layers is predefined and domain independent. The ontology becomes domain independent by asserting facts about the factor hierarchy, cases, and case factors for the appropriate CBR ontology classes and relations in the CBR ontology. Thus, the CBR system is domain independent until data is used to populate the factor and case knowledge in the CBR ontology knowledge base. In particular, the CBR system reasons about the knowledge in the lower layers and it dynamically creates temporary reasoning results at each layer until the final layer provides the final CBR results. As a result of this approach, although higher layers may have no direct knowledge of the domains, factors, cases, or decisions contained in the lower layers, they are still able to reason about this knowledge in the higher layers in a similar manner contained in the lower layers. Therefore, the CBR system can easily analyze multiple contested issues in a domain, each with their own associated factors and factor hierarchy, as well as their past history of situations/cases with their decisions made on that contested issue.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 2D is a diagram illustrating the relationships between the layers in the CBR hierarchical reasoning system.

FIG. 3A is a diagram illustrating a factor hierarchy model associated with a contested issue according to an exemplary embodiment of the invention.

FIG. 3B is a diagram illustrating examples of kinds of case factors from a legal domain according to an exemplary embodiment of the invention.

FIG. 3C is a diagram illustrating a factor hierarchy of case factors depicted in FIG. 3B.

FIG. 3D is a diagram illustrating a case comparison including case factors depicted in FIG. 3B.

FIG. 4C1 is a diagram illustrating an argument information model used by the CBR system.

FIG. 4C2 is a diagram illustrating the set of arguments in a CBR argument scheme reasoning model from the "pro" perspective according to an exemplary embodiment of the invention.

FIG. 5C is a diagram illustrating cases and their corresponding case factors according to an exemplary embodiment of the invention.

FIG. 5D is a diagram illustrating inferred factors for factor partition P1-P6 for each case comparison according to an exemplary embodiment of the invention.

FIG. 6A1 is a diagram illustrating CBR ontology classes for a factor hierarchy according to an exemplary embodiment of the invention.

FIG. 6A2 is a diagram illustrating the reasoning relationships between reasoning outcome ontology classes of a CBR ontology and the classes representing case comparisons, cases, factor partitions and factors with identifications of the reasoning outcome classes according to an exemplary embodiment of the invention.

FIG. 6A3 is a CBR ontology instance diagram illustrating the corollary reasoning outcome results according to an exemplary embodiment of the invention.

FIG. 6A4 is a CBR ontology instance diagram illustrating the factor hierarchy-factor instance assertions according to an exemplary embodiment of the invention.

FIG. 6F1 is a diagram illustrating the CBR ontology pattern for case comparison factor partitions P1 to P4 according to an exemplary embodiment of the invention.

FIG. 6F2 is a diagram illustrating the CBR ontology pattern for case comparison factor partitions P5 and P6 according to an exemplary embodiment of the invention.

FIG. 7A is a diagram illustrating a user interface according to an exemplary embodiment of the invention.

FIG. 7B is a diagram illustrating the user interface in FIG. 7A according to another exemplary embodiment of the invention.

FIG. 7C is a diagram illustrating a user interface for supporting "What if" CBR reasoning outcomes analysis of a current case with respect to modifying the set of factors asserted for that case.

FIG. 7D is a diagram illustrating a user interface for supporting the entering of information to define a factor hierarchy according to an exemplary embodiment of the invention.

DETAILED DESCRIPTION OF EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person skilled in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
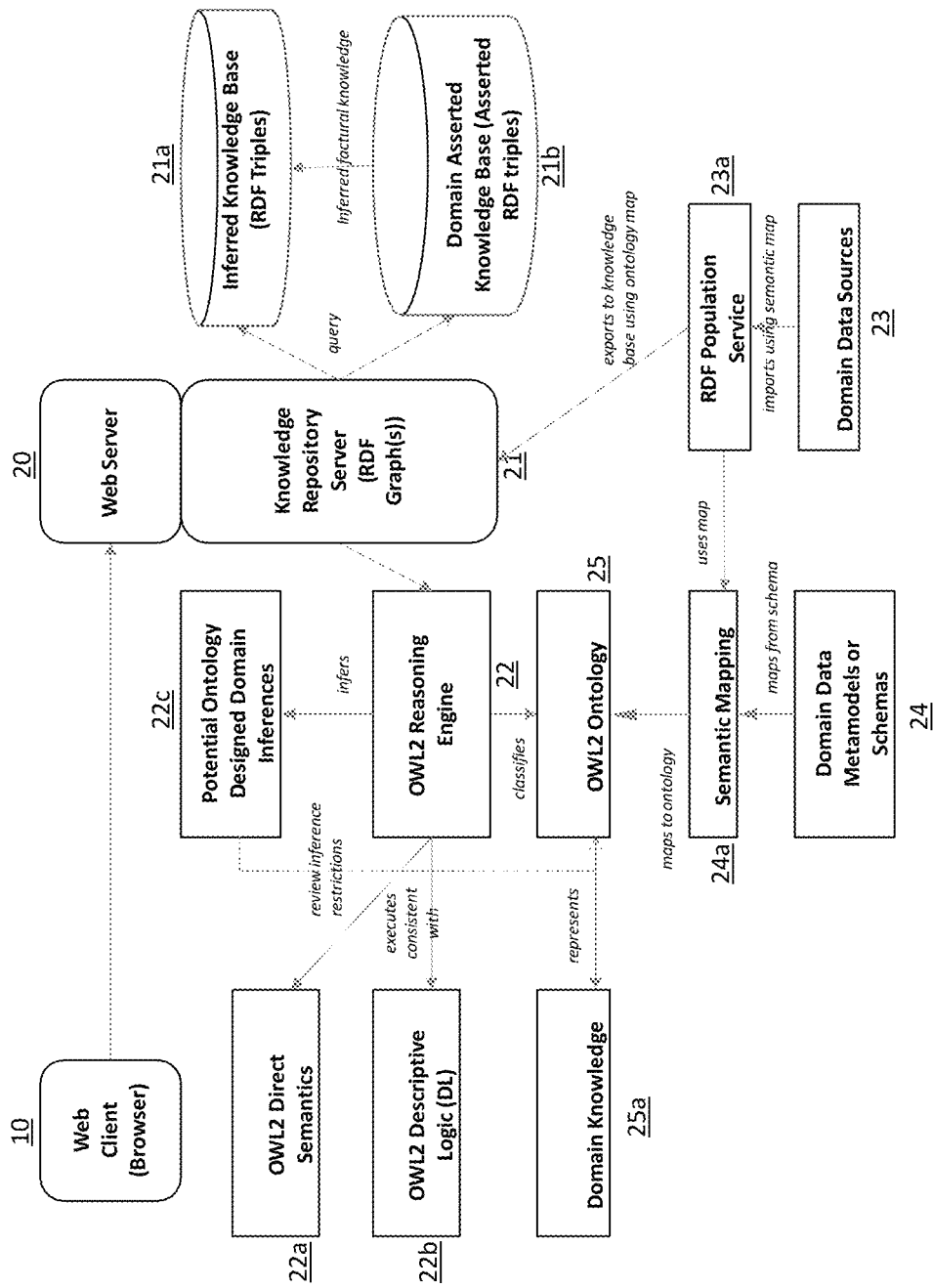
FIG. 1 is a system functional diagram of a generic ontology knowledge and reasoning system and its ontology and functional components according to an exemplary embodiment of the invention.

FIG. 1 is a system functional diagram of a generic ontology knowledge and reasoning system and its ontology and functional components according to an exemplary embodiment of the invention. According to an embodiment, the generic ontology knowledge system has one or more computer processor(s) that provides the computer processing power and memory to host and execute the following kinds of system software identified as the web server 20, knowledge repository server 21, OWL 2 Web Ontology Language ("OWL2") reasoning engine 22, semantic mapping service 24*a*, and RDF population service 23*a*. A separate, computer-persistent, storage technology system hosts the knowledge system ontologies 25 and 22*c*, knowledge bases 21*a*, 21*b*, domain data metamodels or schemas 24, and domain data sources 23. The OWL2 direct semantics 22*a* is explicitly defined in the OWL2 ontology language (DL) 22*b*, and its execution is performed by the OWL2 reasoning engine 22.

According to an embodiment, the web client 10 is configured to access the web server 20 in order to access web services. In addition, the web client 10 is also configured to access a plurality of knowledge bases via queries to the knowledge repository server 21 which, on behalf of the client request, accesses the asserted knowledge base 21*b* containing the asserted facts for factors, factor hierarchy, cases, and the CBR unpopulated ontology, as well as the inferred knowledge base 21*a* containing the reasoning results of the CBR facts in the knowledge base 21*b* via execution of the reasoning engine 22. According to an embodiment, the server 21 provides (i) a storage of the system ontologies (e.g., CBR ontology), and the related ontology knowledge bases and (ii) a standard SPARQL service endpoint for accessing the ontologies and the ontology knowledge bases (both asserted 21*b* and inferred 21*a*). For example, the server 21 may access the inferred knowledge base 21*a*, which is represented as resource description framework (RDF) triples, and may also access the domain asserted knowledge base 21*b*, which is described in asserted RDF triples. Further, the OWL2 reasoning engine 22, when executed by the appropriate system functions, enables a set of inferences to be made for the ontology knowledge bases, which will result in additional sets of facts, expressed in OWL/RDF triples. According to an embodiment, some of these possible direct semantic alignments may be presented to the user as choices to be selected and, once selected, will become part of the persistent store graph server (e.g., server 21) and ontology knowledge base (e.g., knowledge bases 21*a* or 21*b*). For example, as depicted in the figure, the reasoning engine 22 classifies the OWL2 ontology 25, which represents the domain knowledge 25*a*. Further, the reasoning engine 22 is executed consistent with the OWL2 direct semantics 22*a* and the OWL2 descriptive logic 22*b*. In addition, the reasoning engine 22 may also generate potential ontology designed domain inferences 22*c*. Further, a semantic mapping 24*a* may be mapped onto the OWL2 ontology 25. According to an embodiment, the semantic mapping 24*a* may be mapped from the schemas retrieved from the domain data metamodels or schemas 24. Further, the semantic mapping 24*a* may also be utilized to perform an RDF population service 23*a* on the domain data sources 23. The RDFs may then be exported to the appropriate knowledge base via the server 21.

Figure 2A:
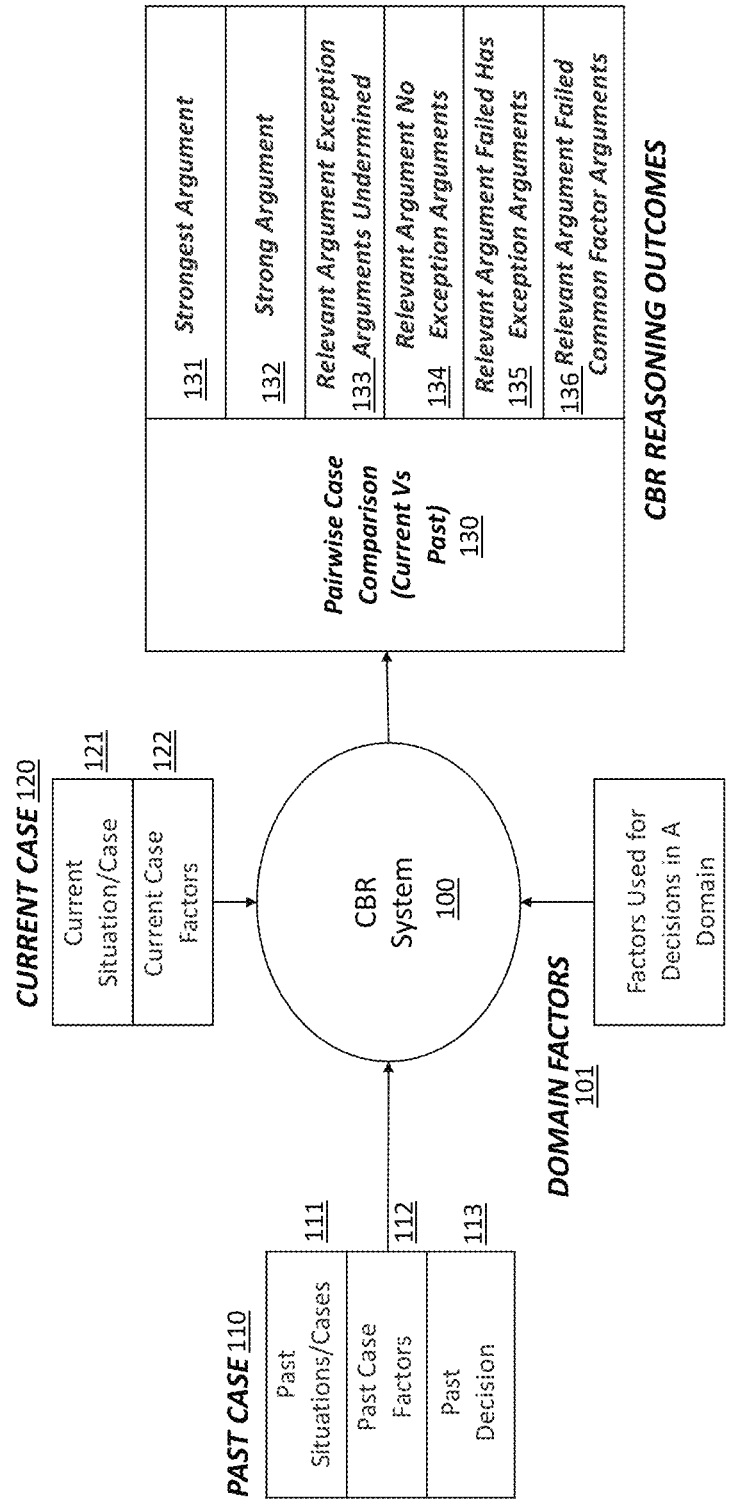
FIG. 2A is a diagram illustrating a CBR system according to an exemplary embodiment of the invention.

FIG. 2A is a diagram illustrating a CBR system according to an exemplary embodiment of the invention. According to an embodiment, a CBR system 100 is configured to: (i) reason about the domain factors hierarchy ontology model 101 when analyzing and comparing the sets of factor occurrences for each comparison of the current case 120 and each of the past cases 110; (ii) perform a pairwise case comparison between the current case 120 and each of the past cases 110 based on the knowledge about factor occurrences 122 and 112, respectively, in each case; and (iii) generate a plurality of CBR reasoning outcomes 131 to 136. As depicted in the figure, the domain factors 101 correspond to the factors used for decisions in a domain and which some subsets of them, e.g., factors 112, were used in decisions for the past cases 110. Further, the case 110 includes a plurality of past situations/cases 111 and their corresponding case factors 112 and decisions 113. Further, the current case 120 includes a current situation/case 121 and the corresponding case factors 122. As further depicted in the figure, the CBR reasoning outcomes includes strongest argument 131, strong argument 132, relevant argument—exception arguments undermined 133, relevant argument—no exception arguments 134, relevant argument failed—has exception arguments 135, and relevant argument failed—missing common factor arguments 136. The outcomes represent an argument strength preference for use of a particular past case, from the strongest, e.g., 131 to the minimally relevant, e.g., 134. Further, 135 and 136 are excepted from use for a similar decision argument due to failing the arguments or not having sufficient common factors. The CBR reasoning outcomes will be described in more detail below.

The CBR knowledge identified in FIG. 2A is hosted by specific CBR functions identified in FIG. 1 as follows. The CBR ontologies' asserted facts for domain factors 101, past cases 110, and current case 120 are stored in the asserted knowledge base 21*b*, while the inferred CBR reasoning outcomes and other ontology inferences (at all layers) are stored in the inferred knowledge base 21*a*. Further, the reasoning functions performed by the system 100 are implemented with the OWL2 reasoning engine 22. Further, according to an embodiment, each of the domain factors 101, past cases 110, and current case 120 are represented using the OWL2 ontology language standards 22*a* and 22*b*, while the CBR ontology is represented with the OWL2 ontology 25.

Figure 2B:
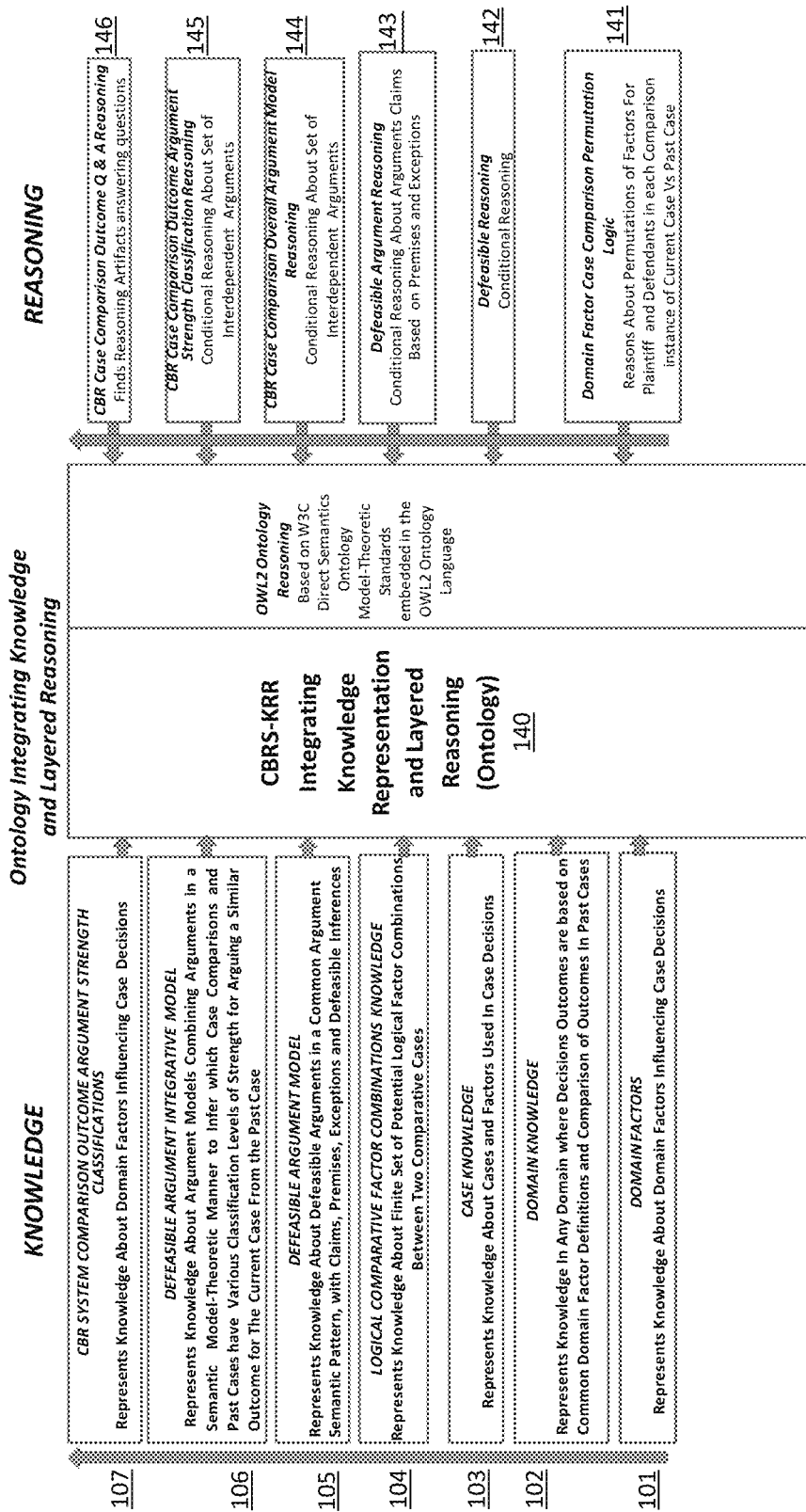
FIG. 2B is a diagram illustrating the ontology hierarchical knowledge representation and reasoning layers according to an exemplary embodiment of the invention.

FIG. 2B is a diagram illustrating the CBR ontology knowledge hierarchical and integration layers 101 through 107, and their corollary reasoning layers 141 through 146 utilizing a CBR system according to an exemplary embodiment of the invention. As depicted in the figure, the CBR system utilizes an CBR Integrating Knowledge Representation and Layered Reasoning ontology 140 to integrate the various knowledge layers 101 to 107 with the reasoning layers 141 to 146. According to an embodiment, the CBR ontology is an unpopulated model of the CBR layers and it's CBR knowledge bases and contains the models and facts (asserted and inferred) of all of the knowledge contained in layers 101 through 107. Further, the CBR ontology implements the direct semantic logic using the models of layers of 141 through 146 and creates the inferred facts from the asserted facts at each layer. According to an embodiment, the knowledge systems include domain factors 101 (e.g., representing knowledge about domain factors influencing case decisions), domain knowledge 102 (e.g., representing knowledge in any domain where decision outcomes are based on common domain factor definitions and comparison of outcomes in past cases, e.g., law, regulatory, or other domains where past decisions using factors influence current situation decisions), case knowledge 103 (e.g., representing knowledge about cases and factors used in case decisions), logical comparative factor combinations knowledge 104 (e.g., representing knowledge about six sets of potential logical factor combinations between two comparative cases), defeasible argument model 105 (e.g., representing a common model for all arguments expressed in a fashion to enable defeasible arguments in a common argument semantic pattern, with claims, premises, exceptions, and defeasible inferences), defeasible argument integrative model 106 (e.g., representing knowledge about six specific CBR argument models combining arguments in a semantic model-theoretic manner to infer which case comparisons and past cases have various classification levels of strength for arguing a similar outcome for the current case from the past case), and CBR system comparison outcome arguments strength classifications 107 (e.g., representing knowledge about argument comparison strength of each CBR past case results that this past case can be used as an argument for a similar decision for the current case). Further, according to an embodiment, the domain knowledge 102 includes domain-specific knowledge such as (i) the domain factor controlled vocabulary, (ii) the populated domain factor knowledge base, (iii) the populated domain past cases knowledge base, and (iv) the integration of the populated domain past cases and their populated domain factor knowledge base. Further, the reasoning systems 141 implement domain factor case comparison permutation logic 141 (e.g., reasoning about permutations of factors for each comparison instance of current case vs. past case), defeasible reasoning logic 142 (e.g., conditional reasoning where new occurrences of factors will change the reasoning results for the Argument reasoning 145), defeasible argument reasoning 143 (e.g., conditional reasoning about argument claims based on premises and exceptions where any changes in the them will change the reasoning outcomes), CBR case comparison overall integrative argument model reasoning 144 (e.g., conditional reasoning about set of interdependent arguments where the outcomes of one argument reasoning are defined as inputs to another argument), CBR case comparison outcome strength classification reasoning 145 (e.g., conditional reasoning sorting the filtered set of past cases satisfying the arguments by their strength of argument for a similar decision for the current case), and CBR case comparison outcome Q & A 146 typically implemented by a CBR user interface (e.g., find reasoning rational and inferred results answering questions).

Figure 2C:
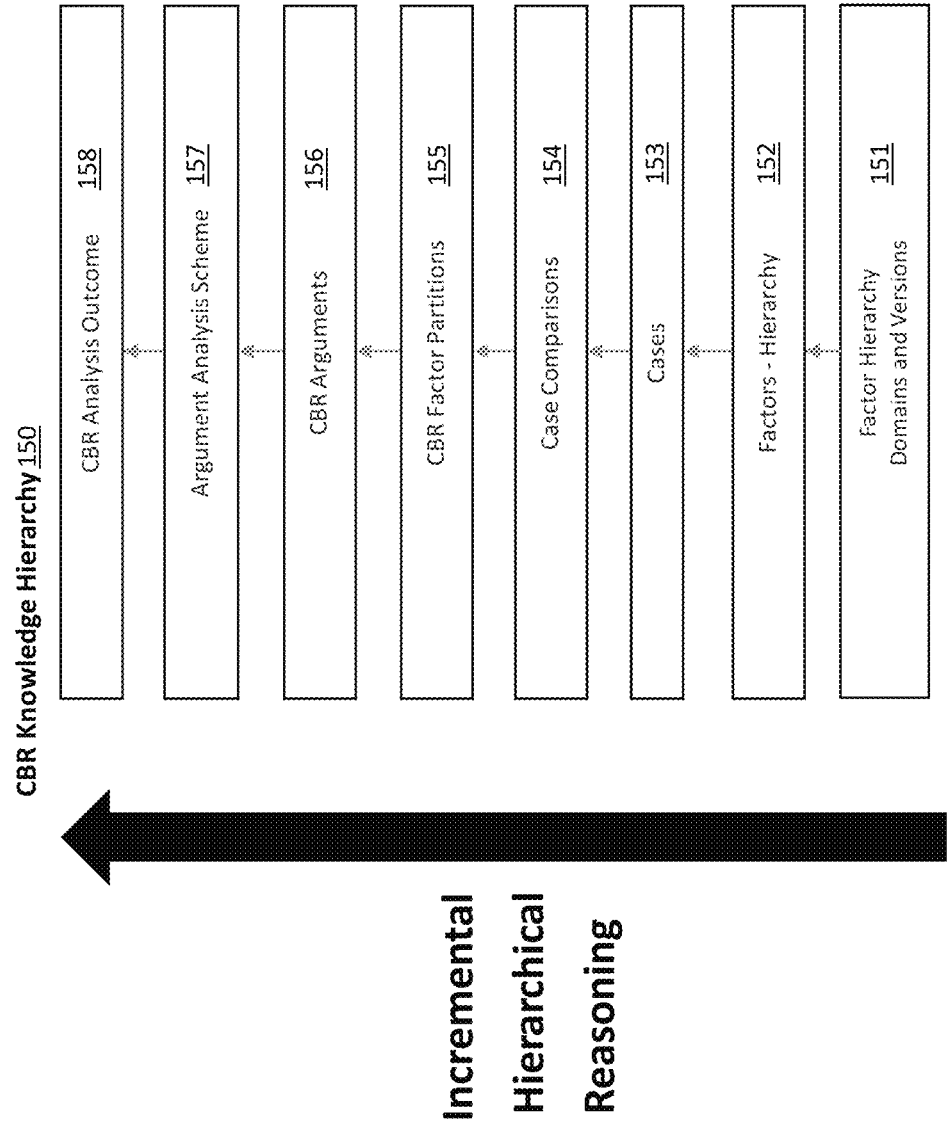
FIG. 2C is a diagram illustrating a simplified view of the hierarchical reasoning system implemented by the CBR system according to an exemplary embodiment of the invention.

FIG. 2C is a diagram illustrating a hierarchical reasoning system implemented by the CBR system according to an exemplary embodiment of the invention. As depicted in the figure, a CBR knowledge hierarchy 150 includes a plurality of layers of 151 to 158. According to an embodiment, the CBR knowledge hierarchy 150 includes a factor hierarchy for a domain of interest and versions layer 151, a factors-hierarchy layer 152, a cases layer 153, a case comparisons layer 154, a CBR factor partitions layer 155, a CBR arguments layer 156, an arguments analysis scheme 157, and a CBR analysis scheme 158. The factor hierarchy domains and versions layer 151 includes the factor hierarchy ontology and factors used to support the decision for an issue in a domain as well as the relationships between the factor hierarchy versions based on the various factor states. The factors-hierarchy layer 152 includes the factors asserted for a case defined from a factor hierarchy version 151. Domain factors are defined as fundamental concepts of knowledge in a specific domain used for deciding an contested issue for a specific situation or case where there are contesting arguments based on these same factors. Identification of domain factors is important since they form the foundation of knowledge that can be used to compare and reason about the relevance of past situation/case with a current situation/case. Each factor has a bias in support of one of the "pro" or "con" side of an outcome for a situation/case level. For example, in the legal domain, a factor may support either the plaintiff or defendant. According to an embodiment, the factors may be used in complex reasoning theories, such as argument schemes, to argue a certain outcome. The cases layer 153 corresponds to cases in the same domain with outcomes from the "pro" and "con" perspective, wherein the cases layer 153 includes information about how a case was decided for a contested issue and is used to identify those corresponding evidence about factors used in deciding the case for the "pro" or "con" perspective. In the case comparisons layer 154, pairs of current and past cases are selected from the set of cases in the layer 153 for comparison, wherein the current case is default to an unknown outcome, the past case has a known decision outcome, and both cases have identified factors used for decisions as well as the corresponding evidence for each factor. The CBR factor partitions layer 155 includes definitions of partitions of unique combinations of "pro" factors and "con" factors for each case comparison instance (e.g., current case vs past case). Six CBR partitions are defined, i.e., P1-P6, wherein each definition either supports or weakens an argument for the "pro" or "con" outcome. The CBR partitions will be described in greater detail below in FIG. 4A. The CBR arguments layer 156 includes universal, domain-independent arguments, i.e., AS1-AS6, having claim definitions supporting either the "pro" or "con" outcome, or satisfying an exception definition that negates the argument claim. Further, premises and exceptions for an argument are defined as logical dependencies on the particular CBR factor partitions occurrence. The argument schemes will be described in greater detail below. The arguments analysis scheme layer 157 includes a hierarchical scheme of the domain-independent arguments AS1-AS6 organized in a logical dependency, where the claims of one argument act as either a premise of the higher-level argument or an exception negating the claims of the higher level argument. The CBR analysis outcome 158 includes the results of the CBR hierarchical argument scheme, e.g., outcomes 131 to 136. Further, according to an embodiment, the CBR ontology knowledge system persists the results of all of its analyses at all layers including the argument reasoning higher layers of which past cases satisfy and don't satisfy that particular argument for each argument in the hierarchical argument scheme. In this way the hierarchical reasoning system provides explicit and visible knowledge to explain the rational for its final set of past case recommendations and their classifications.

FIG. 2D is a diagram illustrating the relationships between the CBR hierarchical reasoning layers in the CBR hierarchical reasoning system of FIG. 2C and the conceptual and knowledge representation as well as reasoning models for each layer, which in turn are represented as ontology patterns in the OWL2 ontology which form the components of the CBR Ontology. Further, each area of knowledge illustrated in the layers of FIG. 2B is organized as models for each layer in FIGS. 2C and 2D. In particular, each layer model in FIG. 2C is represented as an ontology pattern in the CBR ontology of FIG. 2D. See Table 1 below relating these models and ontology patterns to the layers. For example, the layer 151, which is identified in FIGS. 2C and 2D, has a corresponding factor hierarchy model 151-M (e.g., FIG. 3A).

The following Table 1 identifies the concept models used to define the kind of knowledge reasoned about in each layer as well as the ontology patterns used to create the ontology reasoning capability for each layer and across the layers. The first column identifies the CBR reasoning layer and its component in FIG. 2C, while the second column identifies the corollary concept model for each layer in FIG. 2D as well as the model diagram Figure for that layer and the third column references the respective CBR ontology diagrams for each layer (including the example assertion and reasoning results).

TABLE 1

Figure 3E:
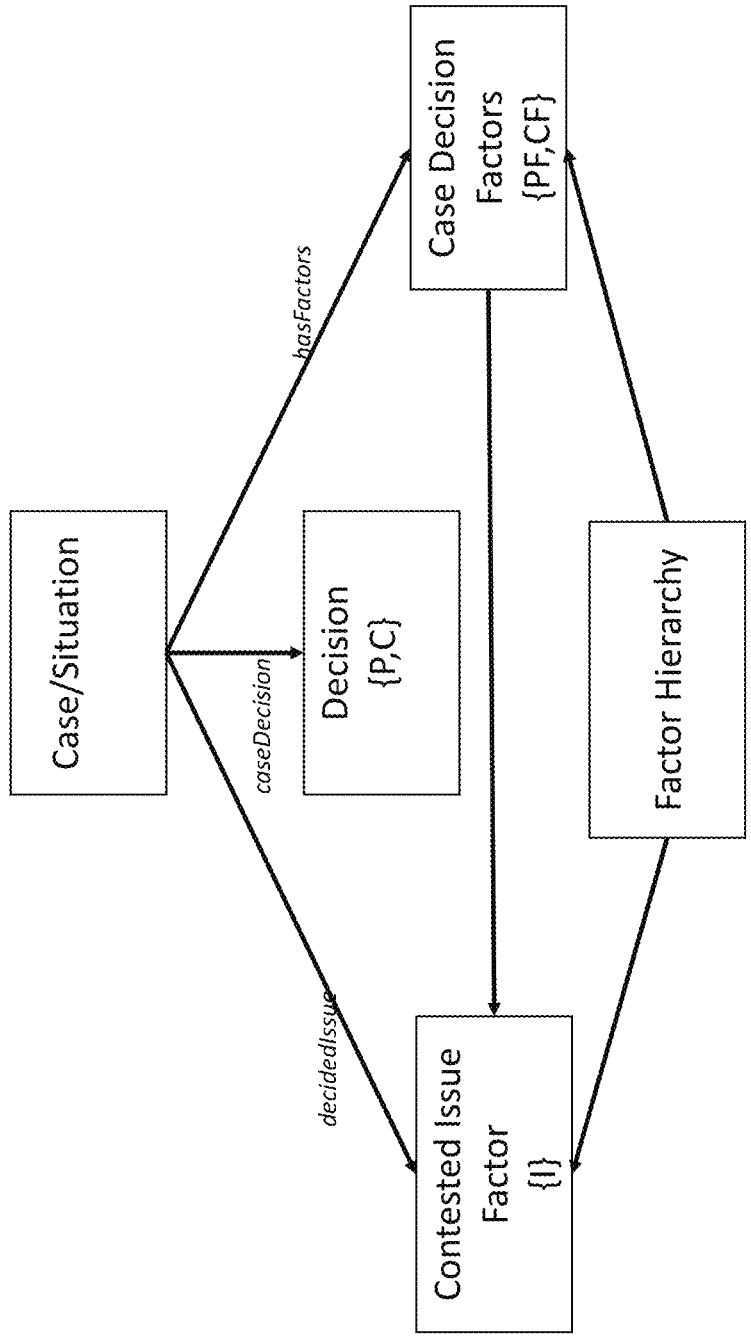
FIG. 3E is a diagram illustrating an information model used by the CBR system ontology to represent knowledge about each case/situation.
Figure 3F:
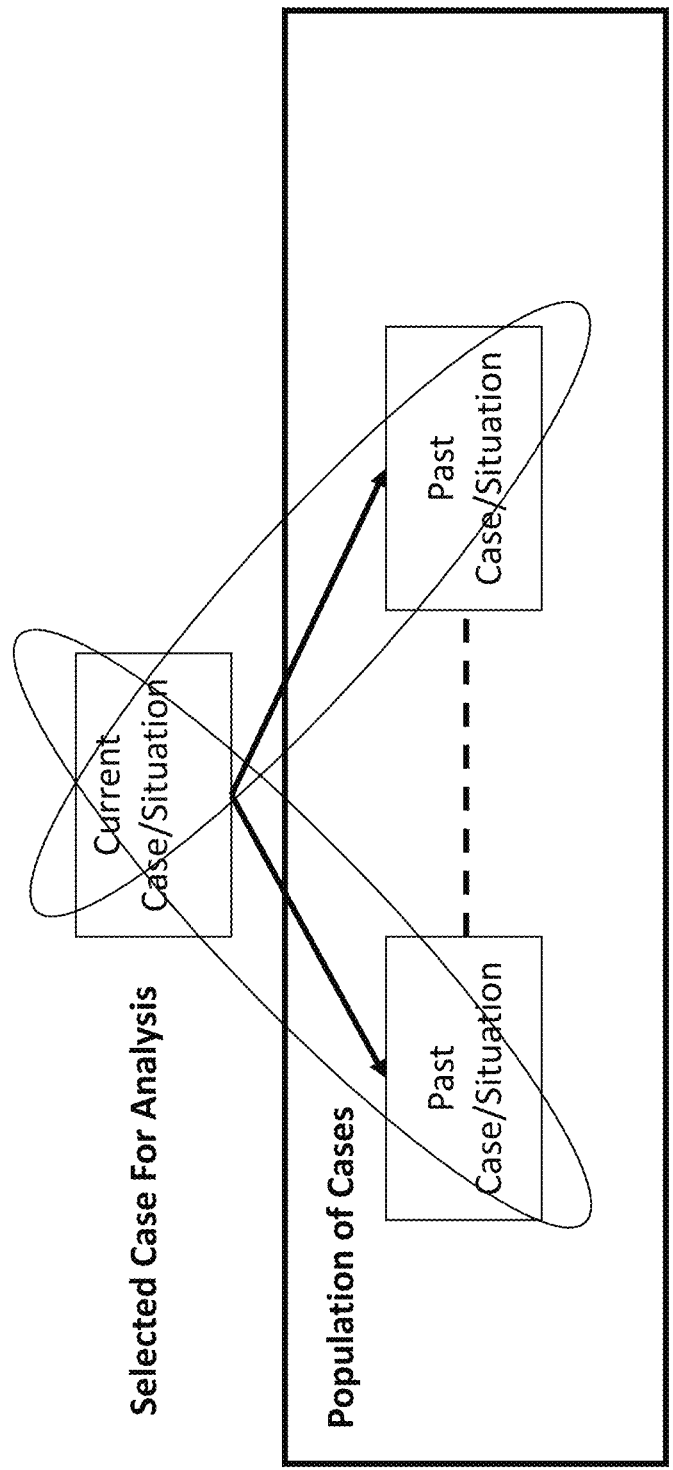
FIG. 3F is a diagram illustrating the information model used by the CBR system ontology to represent knowledge about each case comparison instance.
Figure 4A:
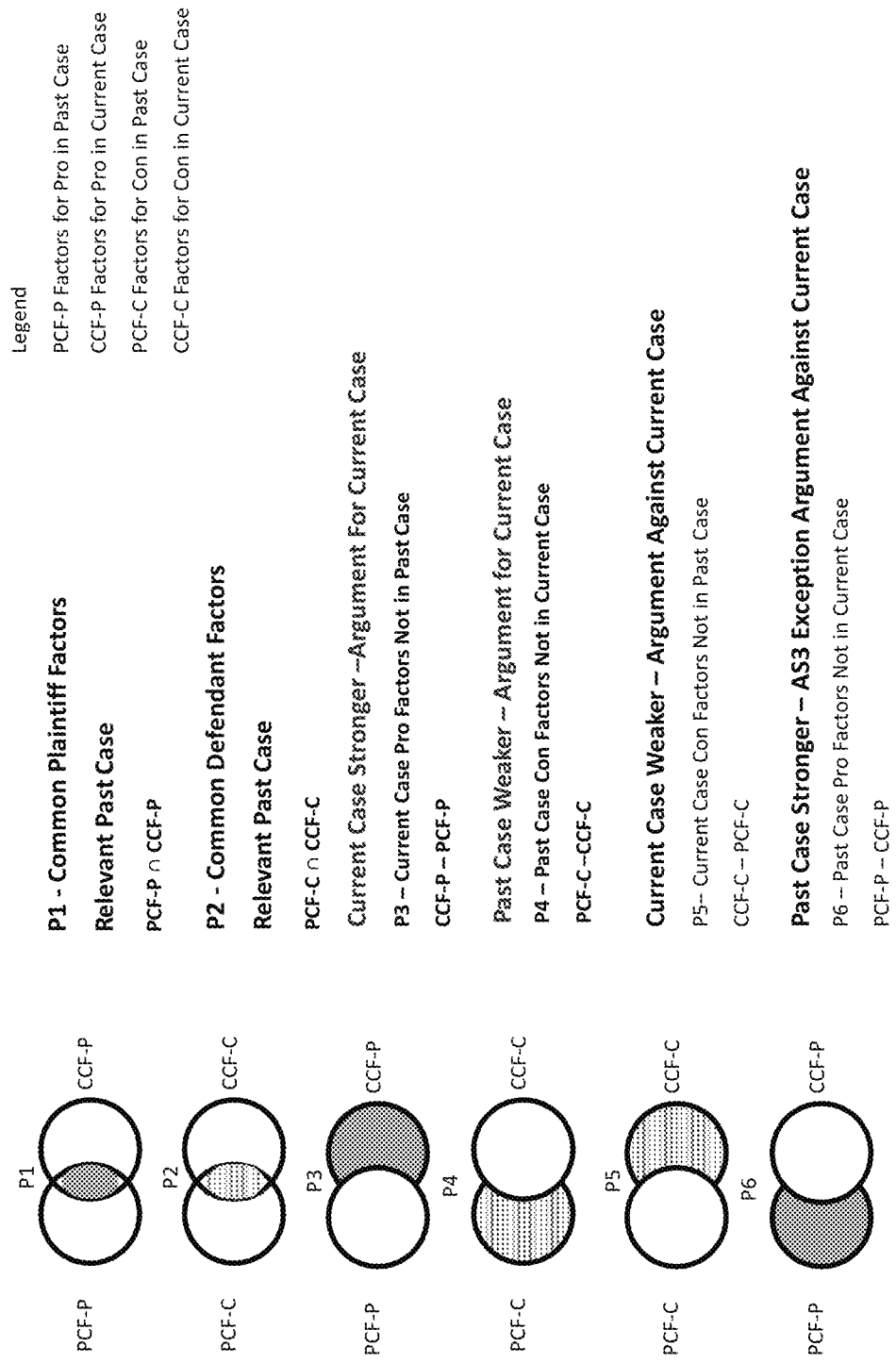
FIG. 4A is a diagram illustrating a case comparison factor partitions from a "pro" perspective according to an exemplary embodiment of the invention.
Figure 4B:
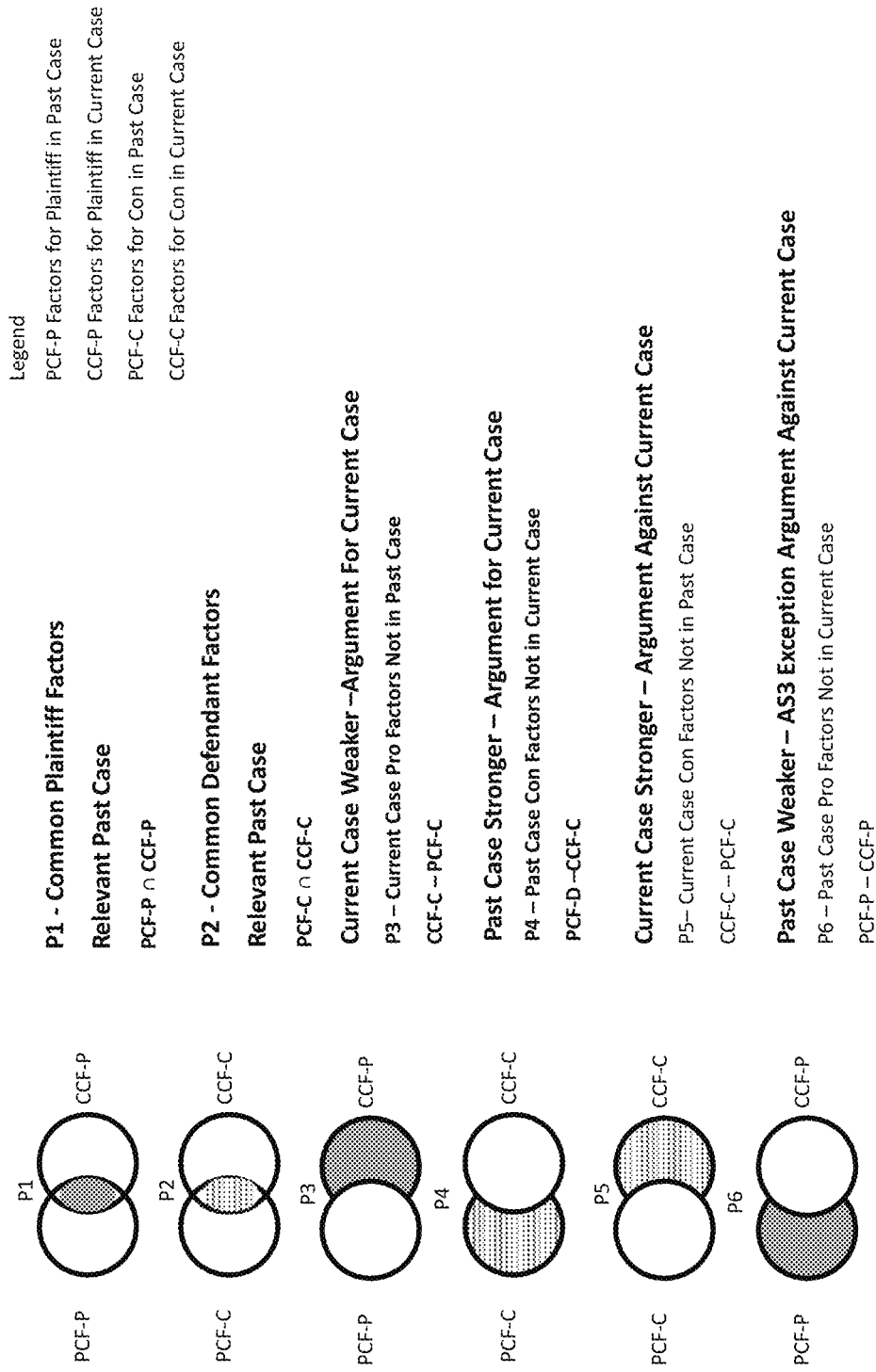
FIG. 4B is a diagram illustrating a case comparison factor partitions from a "con" perspective according to an exemplary embodiment of the invention.

| CBR Reasoning Layer (FIG. 2C) | Layer Concept Knowledge Model (FIG. 2D) | CBR Ontology Pattern, Example Ontology Pattern Assertions/Reasoning Results |
|---|---|---|
| CBR Reasoning Outcome 158 | 158-M; FIG. 4E | FIG. 6A2, FIG. 6A3 (609, 608, 607, 606, 605) |
| Argument Scheme 157 | 157-M; FIG. 4C2 | FIG. 6A2, FIG. 6A3. FIG. 6E |
| CBR Argument 156 | 156-M; FIG. 4C1 | FIG. 6A2, FIG. 6A3, FIG. 6E |
| CBR Factor Partitions 155 | 155-M; FIG. 4A | FIG. 5D, FIG. 6A2, FIG. 6A3, FIG. 6F1, FIG. 6F2 |
| Case Comparison 154 | 154-M; FIG. 3F | FIG. 6A1, FIG. 6A2, FIG. 6A3 |
| Cases/Situations 153 | 153-M; FIG. 3E | FIG. 5C, FIG. 6A1, FIG. 6A2, FIG. 6A3 |
| Case Factor Assertions 152 | 152-M; FIG. 3C | FIG. 5C, FIG. 6A1, FIG. 6A2, FIG. 6A3 |
| Factor Hierarchy 151 | 151-M; FIG. 3A | FIG. 5A, FIG. 5B, FIG. 6A1, FIG. 6A2, FIG. 6A3 |

FIG. 3A is a diagram illustrating a factor hierarchy model associated with a contested issue according to an exemplary embodiment of the invention. The model is universal and customizable, e.g., by having a set of defining factors for a domain asserted as facts in the CBR Ontology knowledge base. In other words, the factor hierarchy model itself is domain independent but becomes domain specific when facts about defining factors are asserted. According to an embodiment, a factor hierarchy 160 includes a contested issue 161, mid-parent factors 162, leaf factors 163, as well as the dependent relations between them. As depicted in the figure, the contested issue 161 is an issue with a defined preference for one side, pro or con, which is influenced by its factor hierarchy of mid-factors 162 and leaf-factors 163. The domain factors 162 and 163 are defined relevant to the contested issue 161, each factor is inherently biased to the defined pro/con for each domain factor relevant to that contested issue 161. For example, the domain factors may be labeled with either "(P)" or "(C)." Further, according to an embodiment, the mid parent factors 162 are domain concepts that have supporting or opposing leaf factors 163. Further, these parent mid-factors 162 are used in subsequent CBR argument scheme reasoning to determine whether an existing case factor can be undermined by another factor having the same mid-factor parent. Further, the mid parent factors are used to define a broader domain concept covering a subset of leaf factors 163 in a domain, and which are biased (e.g., pro/con) for a contested issue. The leaf factors 163 are the lowest set of factors, i.e., base factors.

FIG. 3B is a diagram illustrating case factors according to an exemplary embodiment of the invention. In particular, the figure depicts a set of factors 170 for a trade secrets case. According to an embodiment, the trade secrets case may include the following factors: unique product 171, identical product 172, brought tools 173, information-publically known or available 174, and reverse-engineerable 175. Further, as depicted in the figure, factors 171, 172, and 173 are "pro"-biased, while factors 174 and 176 are "con"-biased.

FIG. 3C is a diagram illustrating a factor hierarchy of case factors depicted in FIG. 3B. For example, a factor hierarchy 180 includes a contested issue 181, a mid parent factor 182, and factors 171 and 174 as leaf factors. According to an embodiment, the contested issue 181 is whether information can be considered a trade secret (i.e., "Info-Is-A-Trade Secret"). Further, this particular contested issue is biased to a pro decision. Further, the mid parent factor 182 corresponds to whether certain information is valuable (i.e., "Info-Valuable"). According to an embodiment, the mid-parent factor 182 is also "pro"-biased and, therefore, supports the contested issue 181 (as indicated by the solid arrow between the mid parent factor 182 and the contested issue 181). Further, the mid parent factor 182 is a parent to child factors 171 and 174. As depicted in the figure, the factor 171 is also "pro"-biased and, therefore, supports the mid parent factor 182 (as indicated by the solid arrow between the factor 171 and the mid parent factor 182). However, the factor 174 is "con"-biased and, therefore, weakens the mid parent factor 182 (as indicated by the dashed arrow between the factor 174 and the mid parent factor 182). According to an embodiment, the relationship between the mid parent factors and the corresponding leaf factors may be utilized in determining whether the occurrence of a unique leaf factor in one case can be undermined by occurrence of another leaf factor, having the same mid parent factor, in the other case.

FIG. 3D is a diagram illustrating the allocation of factors between two cases in a case comparison including case factors depicted in FIG. 3B. As depicted in the case comparison between a current case and a past case, the factor 171, i.e., unique product, is common to both cases. However, the current case also has an additional, unfavorable factor, i.e., factor 174 ("information-publically known or available"). As such, because the factor 174 is material to the claim that the information is valuable (i.e., factor 182), the premise is undermined.

FIG. 3E is a diagram illustrating the information model used by the CBR system ontology to represent knowledge about each case/situation including explanations of its relationships to other CBR information model components. According to an embodiment, each case in the CBR System has three major properties that are used by the CBR Ontology reasoning system when comparing cases: the contested issue factor {I}, the case decision factors {PC, PF}, and the decision {P,C}. The case decision factors correspond to factors in a case that were used to support a decision for an Issue. Each case will have a subset of factors selected from the factor hierarchy. PF factors support a "pro" decision, while CF factors support a "con" decision. Further, according to an embodiment, the factor hierarchy model is typically derived from some authoritative information source such as a code of law and descriptions of case decisions as well as how factors were used to arrive at a decision.

FIG. 3F is a diagram illustrating the information model used by the CBR system ontology to represent knowledge about each case comparison instance and its constituent components, i.e., current case and past case.

FIG. 4A is a diagram illustrating a case comparison factor partitions from a "pro" perspective according to an exemplary embodiment of the invention. The CBR ontology represents the concepts in this diagram and enables reasoning to infer the appropriate partition for the factors of both cases in the case comparisons. See FIGS. 6F1 and 6F2 for the factor partition ontology patterns. P1 identifies the common factors that are biased for the "pro" perspective or "P" (the "pro" factors being associated with a solid filling). P2 identifies the common factors that are biased for the "con" perspective or "C" (the "con" factors being associated with a hashed filling). P3 identifies the unique factors in the current case, not in the past case, biased for P. P4 identifies unique factors in the past case, not in the current case that are biased for C. P5 identifies the unique factors in the current case, not in the past case, that are biased for C. P6 identifies the unique factors in the past case, not in the current case, that are biased for P. FIG. 4B is a diagram illustrating a case comparison factor partitions from a "con" perspective according to an exemplary embodiment of the invention.

FIG. 4C1 is a diagram illustrating the core CBR Argument model used for each of the AS1 through AS6. Each argument is comprised of a subset of logical claims that must be satisfied and one or more "not" claims that should not be satisfied in order for the argument to hold. If the "not" claim is satisfied than the overall argument is said to be excepted or does not hold. An argument may also have other sub-arguments of one or more of its claims that also have to be satisfied, and in this way enable the construction of the CBR argument scheme from integration of multiple arguments such as AS1 through AS6, as illustrated in FIG. 4C2.

FIG. 4C2 is a diagram illustrating an argument reasoning scheme from the "pro" perspective according to an exemplary embodiment of the invention. In particular, the argument reasoning scheme in FIG. 4C2 utilizes the argument reasoning and schemes described in Table 2 below.

TABLE 2

| Argument | Factor Partition | Argument Claim | Argument Reasoning |
|---|---|---|---|
| AS3 | P6 | Past case stronger exception | If P6 occurs with a past case having a unique differentiating factor for P, without AS3-P3 or AS3-P4 being entailed, than this past case instance is excepted and does not pass this argument filter for further CBR reasoning.<br>If the past case has no P6 partition than the past case is passed on for further CBR reasoning.<br>If P6 occurs and is undermined by either the AS3-P3 or AS3-P4 partitions, then the past case is also passed on for further CBR reasoning. |
| AS3-P3 | P3 | Current case stronger partition | If P3 occurs with the current case having a unique differentiating factor for P, and it has the same factor parent as in P6, then the AS3 claim is undermined and the past case instance is not excepted and, therefore, is passed along for further CBR argument reasoning. |
| AS3-P4 | P3 | Past case weaker partition | If P4 occurs with a past case having a unique differentiating factor for C and it has the same factor parent as in P6, then the AS3 claim is undermined and the past case instance is not excepted and, therefore, is passed along for further CBR argument reasoning. |
| AS2 | P6 | Preference for factors supporting P than factors support C | This argument simply passes all of the cases that were not excepted by AS3, i.e., either don't have a P6 partition or the P6 partition was undermined by either AS3-P3 or AS3-P4 |
| AS4 | P5 | Current case weaker exception | If P5 occurs with the current case having a unique differentiating factor for C, without AS4-P3 or AS4-P4 being entailed, than this past case instance is excepted and does not pass this argument filter for further CBR reasoning.<br>If the past case has no P5 partition then the past case is passed on for further CBR reasoning.<br>If the P5 occurs and is undermined by either the AS4-P3 or AS4-P4 partitions, then the past case is also passed on for further CBR reasoning. |
| AS4-P3 | P3 | Current case stronger partition | If P3 occurs with the current case having a unique differentiating factor for P and it has the same factor parent as in P5, then the AS4 claim is undermined and the past case instance is not excepted and, therefore, is passed along for further CBR argument reasoning. |

TABLE 2-continued

| Argument | Factor Partition | Argument Claim | Argument Reasoning |
|---|---|---|---|
| AS4-P4 | P4 | Past case weaker partition | If P4 occurs with a past case having a unique differentiating factor for C and it has the same factor parent as in P5, then the AS4 claim is undermined and the past case instance is not excepted and, therefore, is passed along for further CBR argument reasoning. |
| AS1-P1 | P1 | Past cases with common factor for P | This argument only entails past cases that have at least one common factor with the current case for P |
| AS1-P2 | P2 | Past cases with common factor for C | This argument only entails past cases that have at least one common factor with the current case for C |
| AS1 | NA | Relevant past case argument | Past case satisfying common factors and no (i) argument claim exceptions or (ii) undermined argument claim exceptions. Intersection of past cases (i) satisfying AS1-P1 and AS2-P2 and (ii) not excepted by AS3 or AS4. |
| AS5 | P3 | Strong argument - Stronger current case argument | Past cases satisfying AS1 and AS5 (with P3 entailed). |
| AS6 | P4 | Strong argument - Weaker past case | Past cases satisfying AS1 and AS6 (with P4 entailed). |
| AS5 and AS6 | P3 and P4 | Strongest Argument | Past cases satisfying AS1, AS5 (with P3 entailed), and AS6 (with P4 entailed). |

Figure 4D:
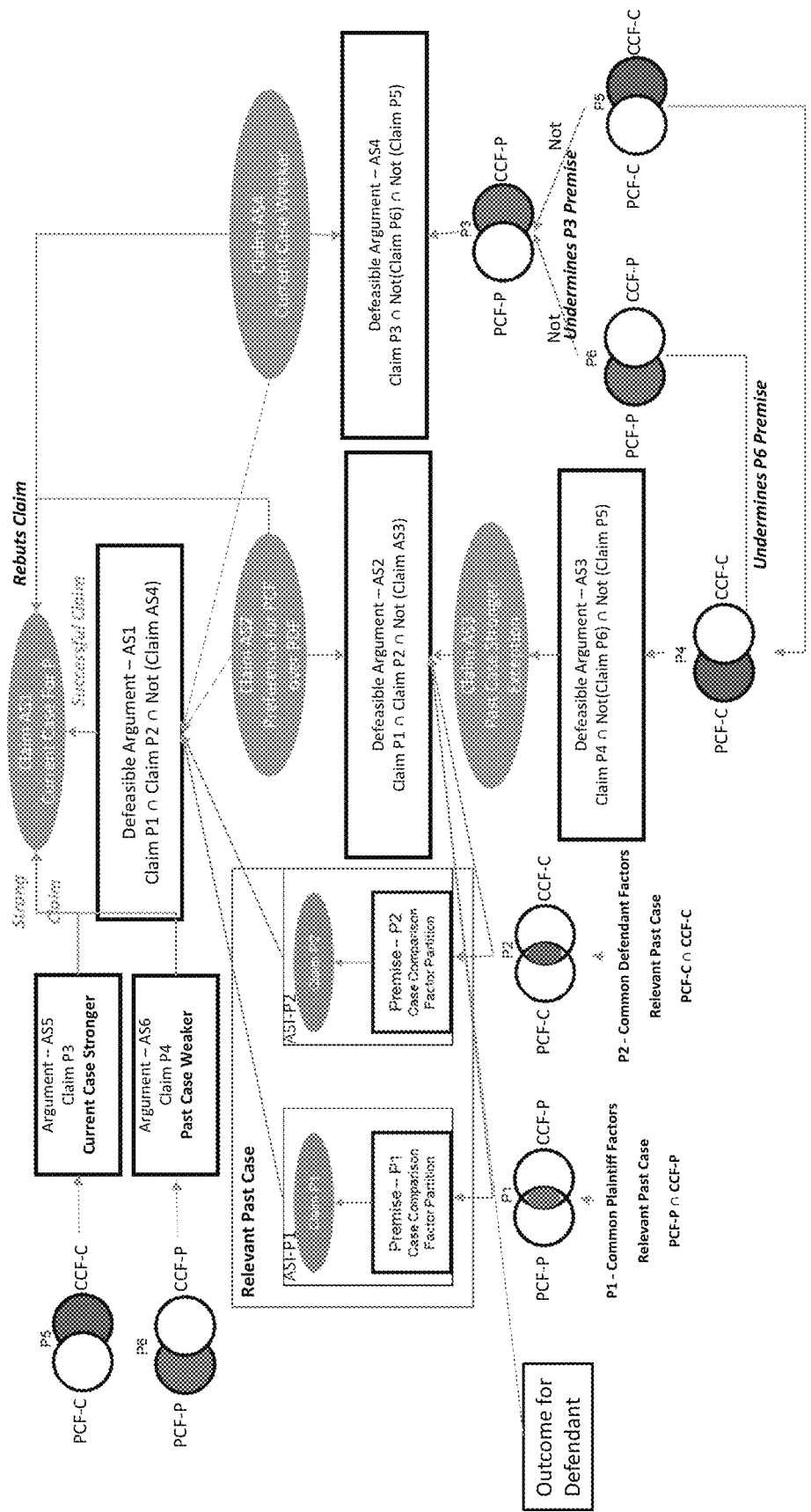
FIG. 4D is a diagram illustrating the set of arguments in a CBR argument scheme reasoning model from the "pro" perspective according to an exemplary embodiment of the invention.
Figure 4E:
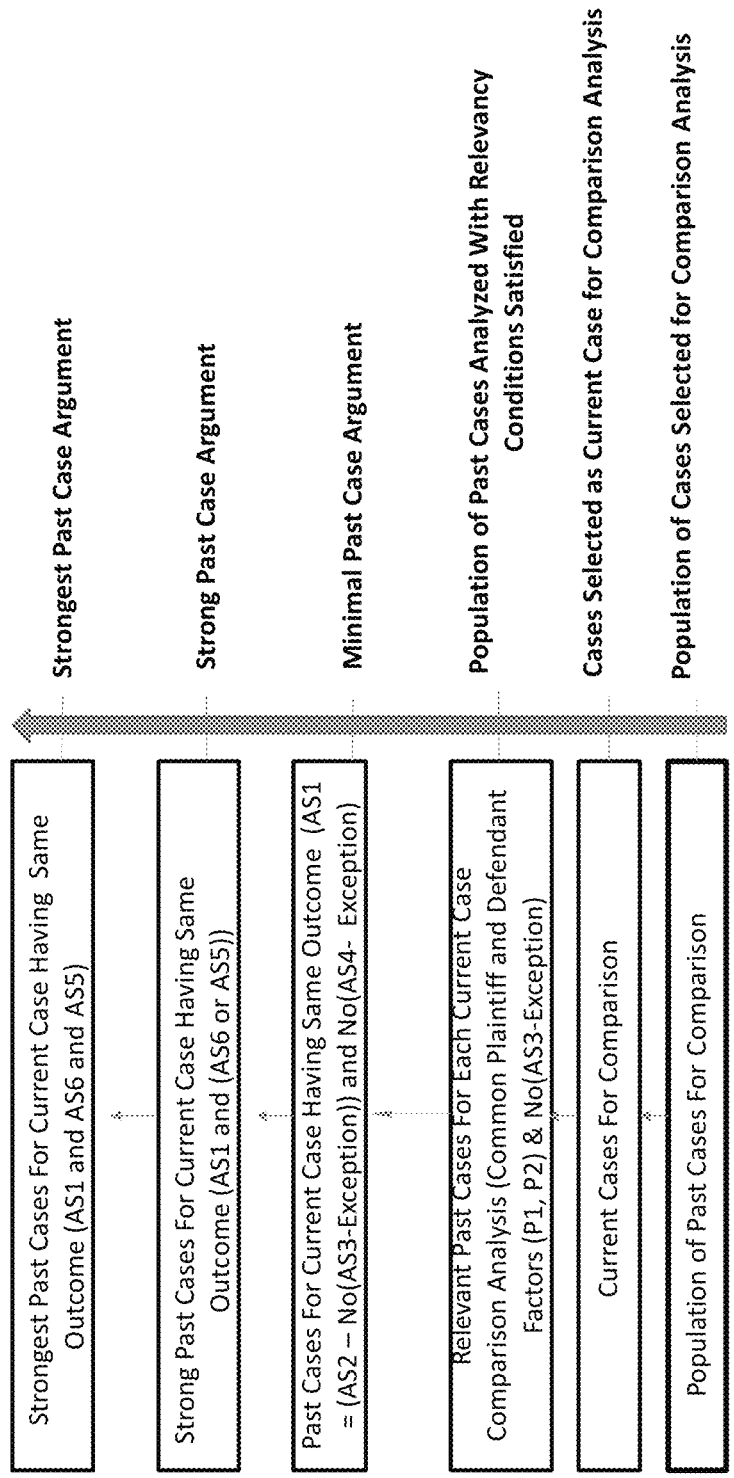
FIG. 4E is a diagram illustrating CBR system sorted reasoning outcomes according to their argumentative strength in an exemplary embodiment of the invention.

Similar to FIG. 4C2, FIG. 4D is a diagram illustrating an argument reasoning scheme from the "con" perspective.

FIG. 4E is a diagram illustrating CBR system reasoning outcomes implementing the argument schemes according to an exemplary embodiment of the invention. As depicted in the figure, in a first step (e.g., starting from the bottom), a plurality of past cases are selected for the comparison analysis. Then, in a second step, a corresponding current case is selected for the comparison analysis. Then, in a third step, during the comparison analysis, relevant past cases are determined for each current case. In particular, past cases may be considered relevant if they satisfy the AS1 argument relevancy conditions. For example, a past case may be considered relevant if there are common plaintiff and defendant factors, i.e., factor partitions P1 and P2 are satisfied, and the AS3 exception (i.e., past case strong exception) is not satisfied. As such, if one of the above conditions is not satisfied, the past case is not passed along for further processing. Otherwise, if the conditions are satisfied, the past case may proceed to the next step. In the next step, it is determined which past cases have the same desired outcome as the current case. Specifically, it is determined which of the previously processed past cases do not satisfy the AS4 exception (i.e., current case weaker exception). The past cases which do satisfy the AS4 exception are not passed along for further processing, while the ones that don't satisfy the AS4 exception are passed along for further processing. In other words, the "minimal past" cases are those that satisfy the argument AS1 for relevance without satisfying either the exception Argument AS3 for a stronger past case or the exception argument AS4 for a weaker current case. In the next step, it is determined if the remaining past cases satisfy either of the AS5 argument (i.e., stronger current case argument) or the AS6 argument (i.e., weaker past argument). In other words, the "strong past" cases are those that satisfy either the stronger current case argument AS5 or the weaker past argument AS6, while also satisfying the argument AS1 for relevance without satisfying either the exception argument AS3 for a stronger past case or the exception argument AS4 for a weaker current case. Then, in the last step, it is determined which of past cases satisfy both of the AS5 and AS6 arguments. In other words, the "strongest past" cases are those that satisfy both the stronger current case argument AS5 and a weaker past argument AS6, while also satisfying the argument AS1 for relevance without satisfying either the exception argument AS3 for a stronger past case or the exception argument AS4 for a weaker current case.

Figures 5A, 5B:
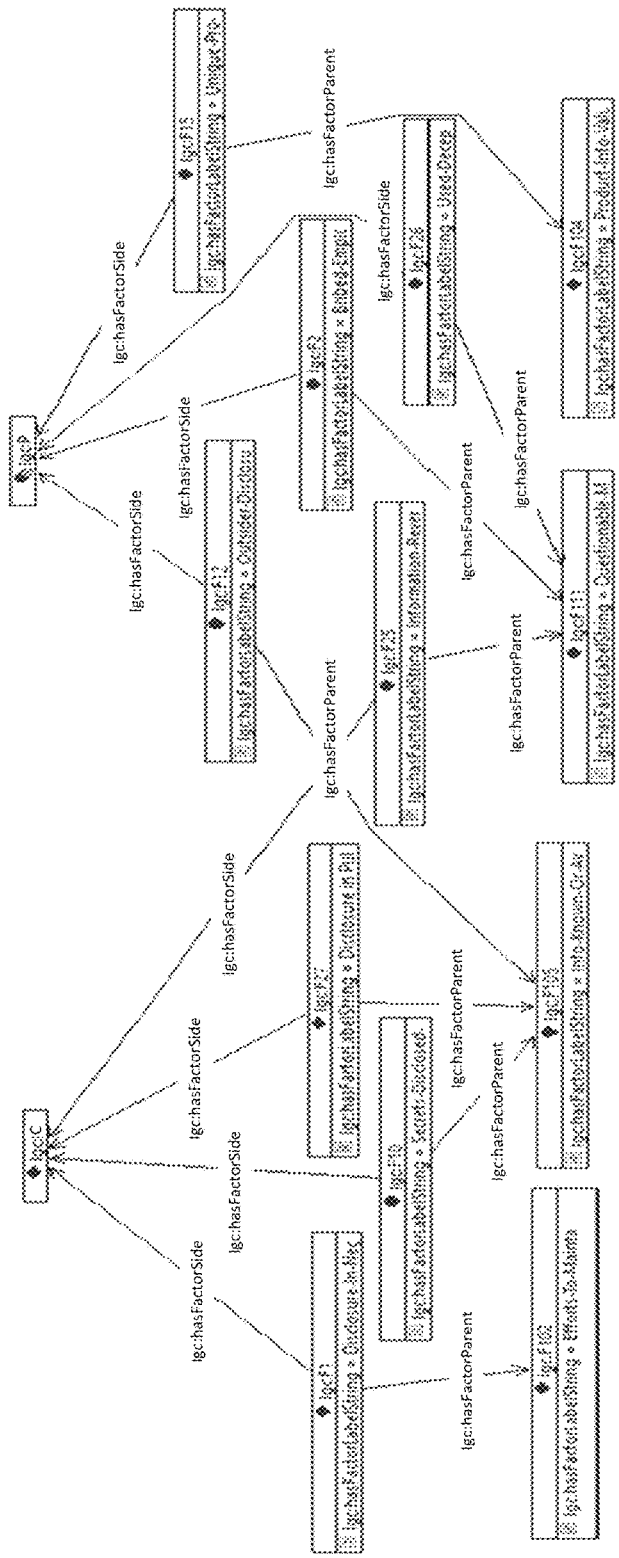
FIG. 5A is a table illustrating example decision factors according to an exemplary embodiment of the invention.
FIG. 5B is an ontology instance diagram illustrating a factory hierarchy of the decision factors depicted in FIG. 5A.

FIG. 5A is a diagram illustrating decision factors according to an exemplary embodiment of the invention. In particular, FIG. 5A depicts the decision factors associated with the trade secret domain. According to an embodiment, each decision factor (e.g., F1, F10, F12, F15, F2, F25, F26, and F27) may be associated with a certain side (i.e., P or C), name (e.g., F1-Disclosure-In-Negotiations, F10-Secrets-Disclosed-To-Outsiders, F12-Outsider-Disclosure-Restricted, F15-Unique-Product, F2-Bribed-Employee, F25-Information-Reverse-Engineered, F26-Used-Deception, and F27-Disclosure in Public Forum), and factor parent (e.g., F102, F105, F104, and F111).

FIG. 5B is a diagram of the CBR ontology instance graphs illustrating the CBR ontology instance factor hierarchy assertions for the pro and con factors identified in FIG. 5A. For example, factor instance F1 has an asserted property "hasFactorSide" to the instance C and also has an asserted property "hasFactorParent" to factor instance F100. Further, factor instance F25 has an asserted property "hasFactorSide" to instance C and also has a property "hasFactorParent" to factor instance F111. Factor instances F1, F10, F12, F15, F2, F25, F26, and F27 are all leaf factors since they only have the an asserted property "hasFactorParent" to other factor instances. Further, mid parent factors instances may also be inferred since there are parent factor instances of at least one leaf factors, i.e., F102, F105, F111 and F104.

FIG. 5C is a diagram illustrating cases and their corresponding case factors according to an exemplary embodiment of the invention. As depicted in the figure, the case entitled "Announce" has asserted case factors F27, F15, and F1. "Bribe" has case factors F1, F15, FVPC, and F2.

"Bribe2" has case factors F25, F2, F15, and F1. "Deceit" has case factors F26, F1, and F15. "Disclose" has case factors F15, F10, and F1. "Restrict" has case factors F12, F15, F10, and F1. "Reverse" has case factors F1, F15, and F25. Lastly, "Vanilla" has case factors F15 and F1. Further, as this example illustrates, each case has an asserted set of factors that were relevant to that case, where each of these case factors are all subsets of the asserted factor hierarchy.

FIG. 5D is a diagram illustrating inferred factors for factor partition P1-P6 for each case comparison according to an exemplary embodiment of the invention. Specifically, the figure depicts (i) a case comparison between a current case CC and a corresponding past case PC and (ii) which corresponding factor partitions are satisfied. For example, for the comparison between current case "Announce" and past case "Disclose," factor partitions P1, P2, P4, and P5 are satisfied. In particular, factor F15 satisfies factor partition P1, factor F1 satisfies factor partition P2, factor F10 satisfies factor partition P4, and factor F27 satisfies factor partition P5. Further, in the comparison between the current case "Bribe" and the past case "Vanilla," factor partitions P1, P2, and P3 are satisfied. In particular, factor F15 satisfies factor partition P1, factor F1 satisfies factor partition P2, and factor F2 satisfies factor partition P3. In the comparison between the current case "Deceit" and the past case "Bribe," factor partitions P1, P2, P3, and P6 are satisfied. In particular, factor F15 satisfies factor partition P1, factor F1 satisfies factor partition P2, factor F12 satisfies factor partition P3, and factor F2 satisfies factor partition P6. In the comparison between the current case "Disclose" and the past case "Vanilla," factor partitions P1, P2, and P5 are satisfied. In particular, factor F15 satisfies factor partition P1, factor F1 satisfies factor partition P2, and factor F10 satisfies factor partition P5. In the comparison between the current case "Restrict" and the past case "Vanilla," factor partitions P1, P2, P3, and P5 are satisfied. In particular, factor F15 satisfies factor partition P1, factor F1 satisfies factor partition P2, factor F12 satisfies factor partition P3, and factor F10 satisfies factor partition P5. In the comparison between the current case "Vanilla" and the past case "Bribe," factor partitions P1, P2, and P6 are satisfied. In particular, factor F15 satisfies factor partition P1, factor F1 satisfies factor partition P2, and factor F2 satisfies factor partition P6. Lastly, in the comparison between the current case "Vanilla" and the past case "Reverse," factor partitions P1, P2, and P5 are satisfied. In particular, factor F15 satisfies factor partition P1, factor F1 satisfies factor partition P2, and factor F25 satisfies factor partition P4.

FIG. 6A1 is a CBR ontology class diagram illustrating the classes and relation properties focused on the CBR factor hierarchy ontology pattern and its relationship to the CBR ontology class case 601. The CBR ontology pattern for factors first defines the class for Factors 602 comprising subclasses for Issue 602c, MidFactor (i.e., mid parent factor) 602a and LeafFactor 602b. Further, all asserted instances of the factors are asserted to the Factor class 602 and the other subclasses having reasoning equivalent axioms based on hasFactorChild and hasFactorParent properties that enable the ontology reasoning to determine the particular Factor subclass type for the instance asserted in the class for Factors 602. The Issue class 602c is defined as kinds of factors having only the hasFactorChild property asserted for other factor instances. Further, according to an embodiment, the Issue class 602c corresponds to a top issue for a factor hierarchy for each associated case/situation, and which has its own tree structure of MidFactors and subsequent LeafFactors. The MidFactor class 602a is defined as kinds of factors that have both the hasFactorParent and hasFactorChild property asserted for other factor instances. The LeafFactor class 602b is defined as kinds of Factors that only have an hasFactorParent property asserted for other factor instances. The CBR reasoning system than automatically infers which of the factor subclasses, 602a, 602b, and 602c an instance of the LegalFactor class 602 belongs based on the corresponding definition of each class. Each factor may also have other properties asserted, as defined in LegalFactor class 602, i.e., hasFactorId, hasFactorLabel, hasFactorSide, hasFactorLabelString. Further, each case instance asserted in the case class 601 has a property asserted for that case for factor instances in the class LegalFactor 602. Further, the CBR ontology pattern may also include Party 610, which corresponds to the party (e.g., plaintiff 610a or defendant 610b) that the decision factors are biased towards.

FIG. 6A2 is a diagram illustrating the reasoning relationships between reasoning outcome ontology classes of a CBR ontology and the classes representing case comparisons, cases, factor partitions and factors with identifications of the reasoning outcome classes according to an exemplary embodiment of the invention. As depicted in the figure, an ontology 600 includes a plurality of ontology classes and property relationships defined between them, e.g., case 601, factor 602, mid parent factor 602a, leaf factor 602b, case comparison 603, factor partitions 604, and CBR argument outcome classes: relevant case comparison 605 satisfying arguments AS1 and AS2, strong argument AS6 606, strong argument AS5 607, strong argument AS5 or AS6 case filter 608, and strongest argument past case filter satisfying both Strong arguments AS5 and AS6 609. According to an embodiment, each case 601 may have property assertions "hasCaseFactors" for a plurality of factors 602, wherein the mid parent factor 602a and the leaf factor 602b are instances of the factor 602. Further, each CaseComparison 603 instance has two property assertions: "hasCurrentCase" and "hasPrecedentCase" for case instances in Case 601. Further, each CaseComparison instance 603 uses ontological reasoning to infer factor partitions instances in Partition class 604. Further, based on the factor partitions 604, each of the compared cases may then be filtered through the relevant case comparison argument filters 605 (i.e., associated with the minimal relevant past case argument AS1 of FIG. 4E), the weaker past case argument AS6 filter 606, the stronger current case comparison argument AS5 filter 607, the strong argument AS5 or AS6 past case filter 608, and the strongest argument AS5 and AS6 past case filter 609 (i.e., associated with the strongest past case argument of FIG. 4E) in order to infer which of the case comparisons satisfy the particular argument conditions and CBR sorted argument strength outcomes.

For example, as depicted in the FIG. 6A3, both of the CBR ontology asserted facts and the inferred CBR ontology reasoning results are illustrated next to their respective CBR ontology classes. Further, the following case comparison instances satisfied the conditions associated with the relevant argument AS1 class 605: "Announce v. Disclose," "Bribe v. Vanilla," "Deceit v. Bribe," "Restrict v. Vanilla," and "Vanilla v. Reverse." Further, the following case comparisons satisfied the conditions associated with the strong argument AS6 for weaker past cases filter 606: "Announce v. Disclose" and "Vanilla v. Reverse." Further, the following case comparisons satisfied the conditions associated with the strong current case argument AS5 607: "Bribe v. Vanilla, "Deceit v. Bribe," and "Restrict v. Vanilla." Further, the following case comparisons satisfied the conditions associated with the strong past case filter 608 satisfying either arguments AS5 or AS6: "Announce v. Disclose," "Bribe v. Vanilla, "Deceit v. Bribe," "Restrict v. Vanilla," and "Vanilla v. Reverse." However, none of the comparison cases satisfied the conditions associated with the strongest past case argument AS5 and AS6 filter 609.

FIG. 6A4 is a CBR ontology instance diagram illustrating the factor instances for a factor hierarchy according to an exemplary embodiment of the invention. As depicted in the figure, the CBR ontology property "hasFactorParent" indicates a factor relationship between one factor instance and another factor instance. Further, the property "hasFactorLabel" refers to a human-readable, descriptive factor label instance.

Figure 6B:
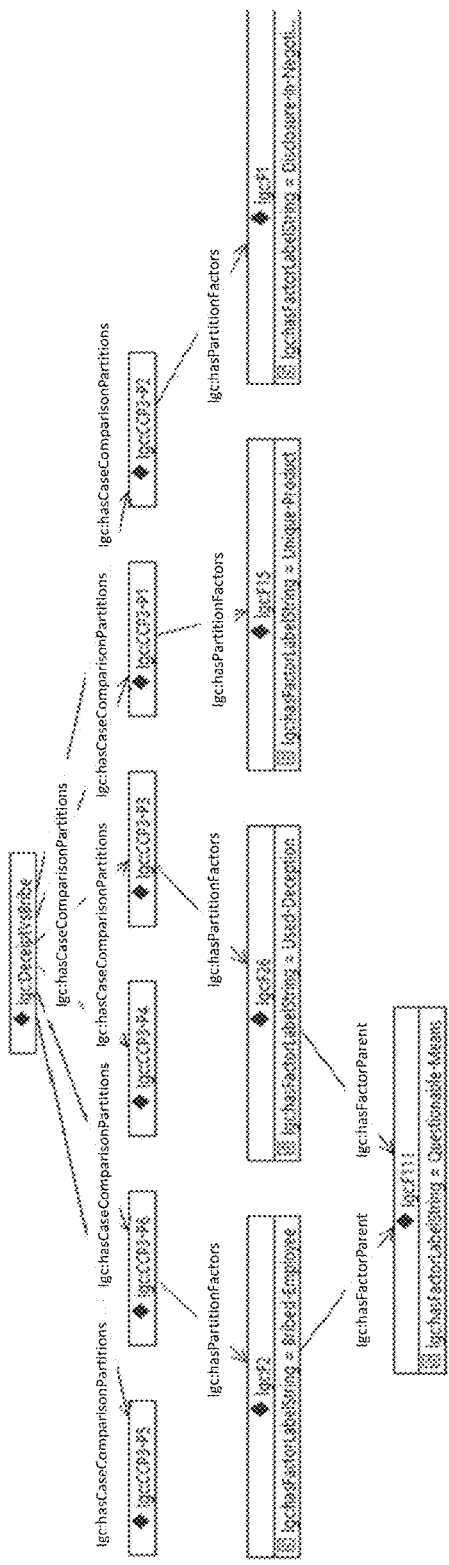
FIG. 6B is a diagram illustrating the CBR ontology inferred case partition instances for a case comparison instance according to an exemplary embodiment of the invention.

FIG. 6B is a diagram illustrating the CBR ontology inferred case partition instances for the case comparison instance according to an exemplary embodiment of the invention. In particular, the factor partitions are depicted for a case comparison between a current case Deceit and a past case Bribe. For example, factor F15 satisfies factor partition P1, F1 satisfies factor partition P2, F26 satisfies factor partition P3, and F2 satisfies factor partition P6. Further, according to an embodiment, factors F2 and F26 share a common factor parent, i.e., F111, thereby allowing past case factor F2 to be replaced by factor F26. As such, based on the common parent factor F111 substitution argument, the discriminating argument exception AS3-P6 may be removed.

Figure 6C:
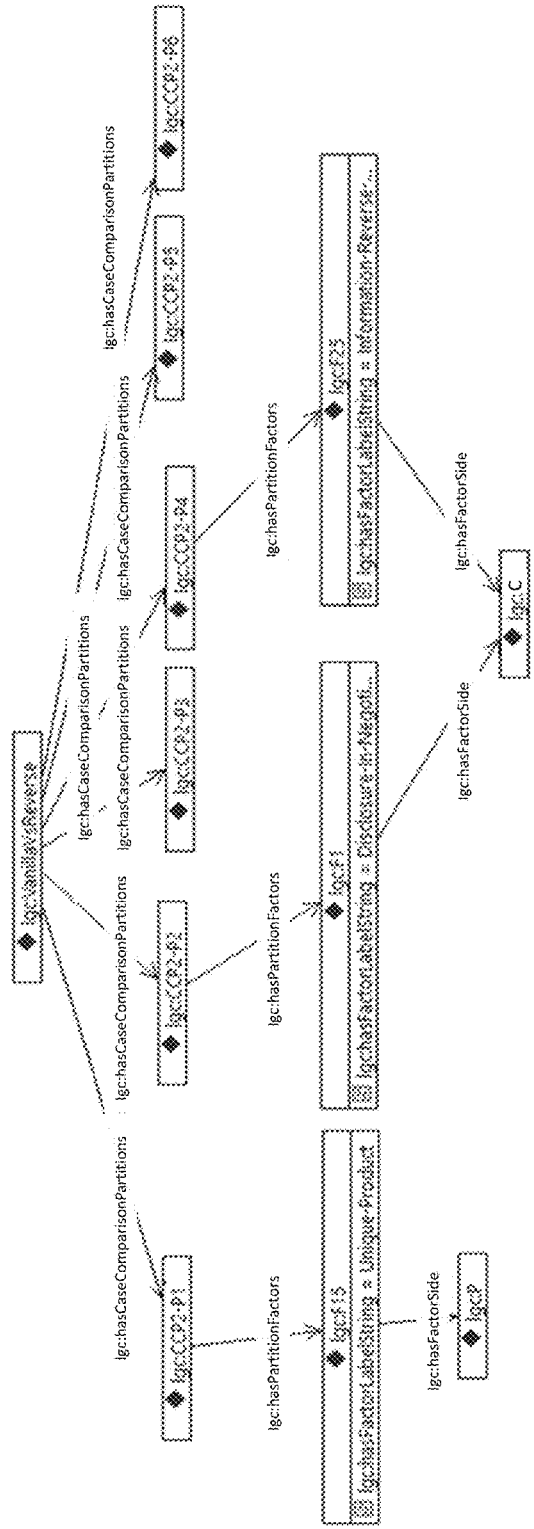
FIG. 6C is a diagram illustrating the CBR ontology inferred case partition instances for another case comparison instance according to an exemplary embodiment of the invention.

FIG. 6C is a diagram illustrating the CBR ontology inferred case partition instances for another case comparison instance according to an exemplary embodiment of the invention. In particular, the factor partitions are depicted for a case comparison between a current case Vanilla and a past case Reverse. For example, the CBR reasoning system infers that factor F15 satisfies factor partition P1, F1 satisfies factor partition P2, and F25 satisfies factor partition P4. Further, factors F1 is biased toward to "P," while factors F1 and F25 are biased towards "C." Further, according to an embodiment, even though the past case Reverse was decided for "P," the case is weaker than the current case Vanilla because of the presence of the unique factor F25, which is biased for "C." Further, unlike FIG. 6B, there are no leaf factors having a common mid parent factor in FIG. 6C.

Figure 6D:
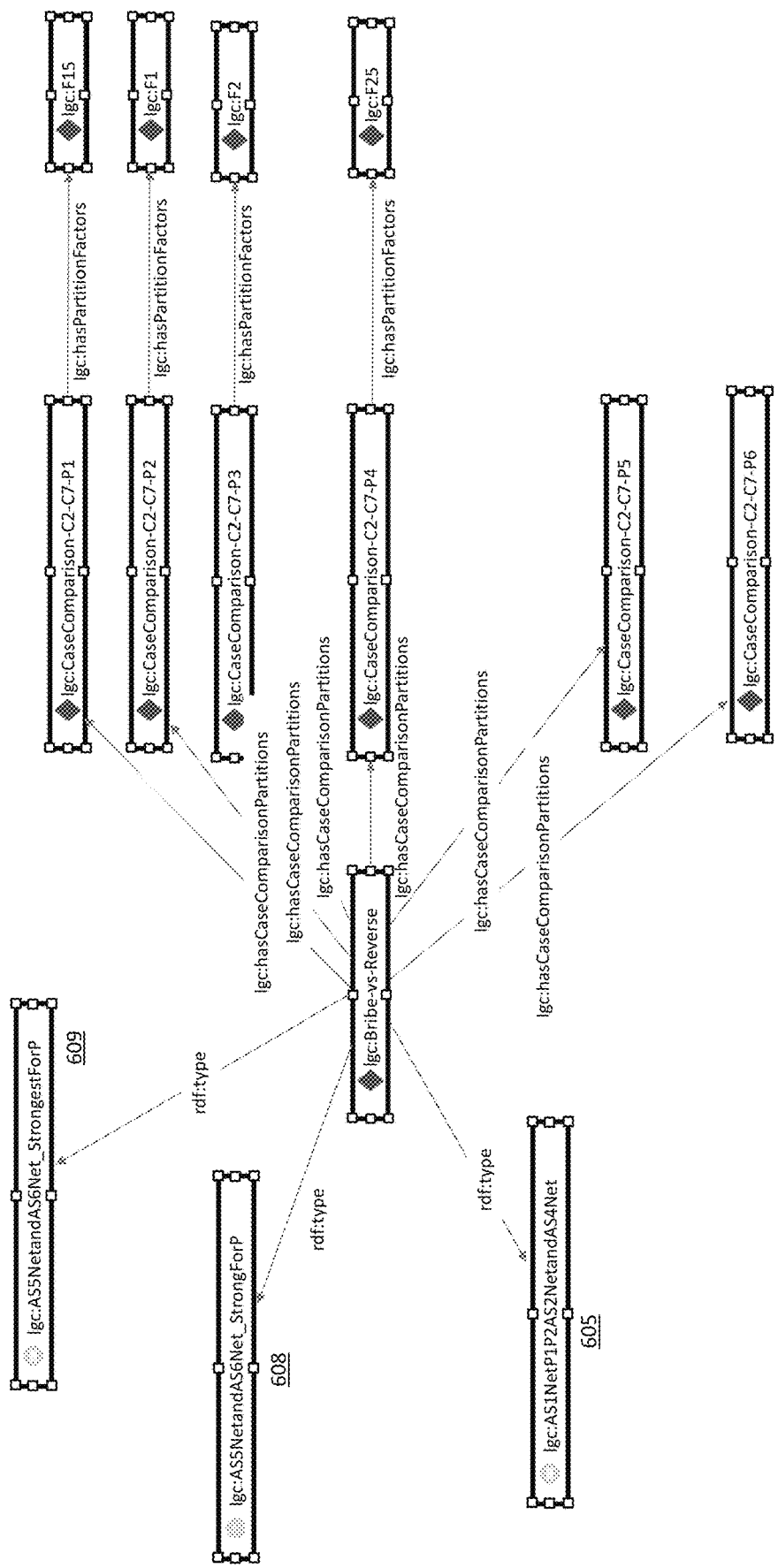
FIG. 6D is a diagram illustrating the CBR ontology inferred case partition instances for another case comparison instance according to an exemplary embodiment of the invention.
Figure 6E:
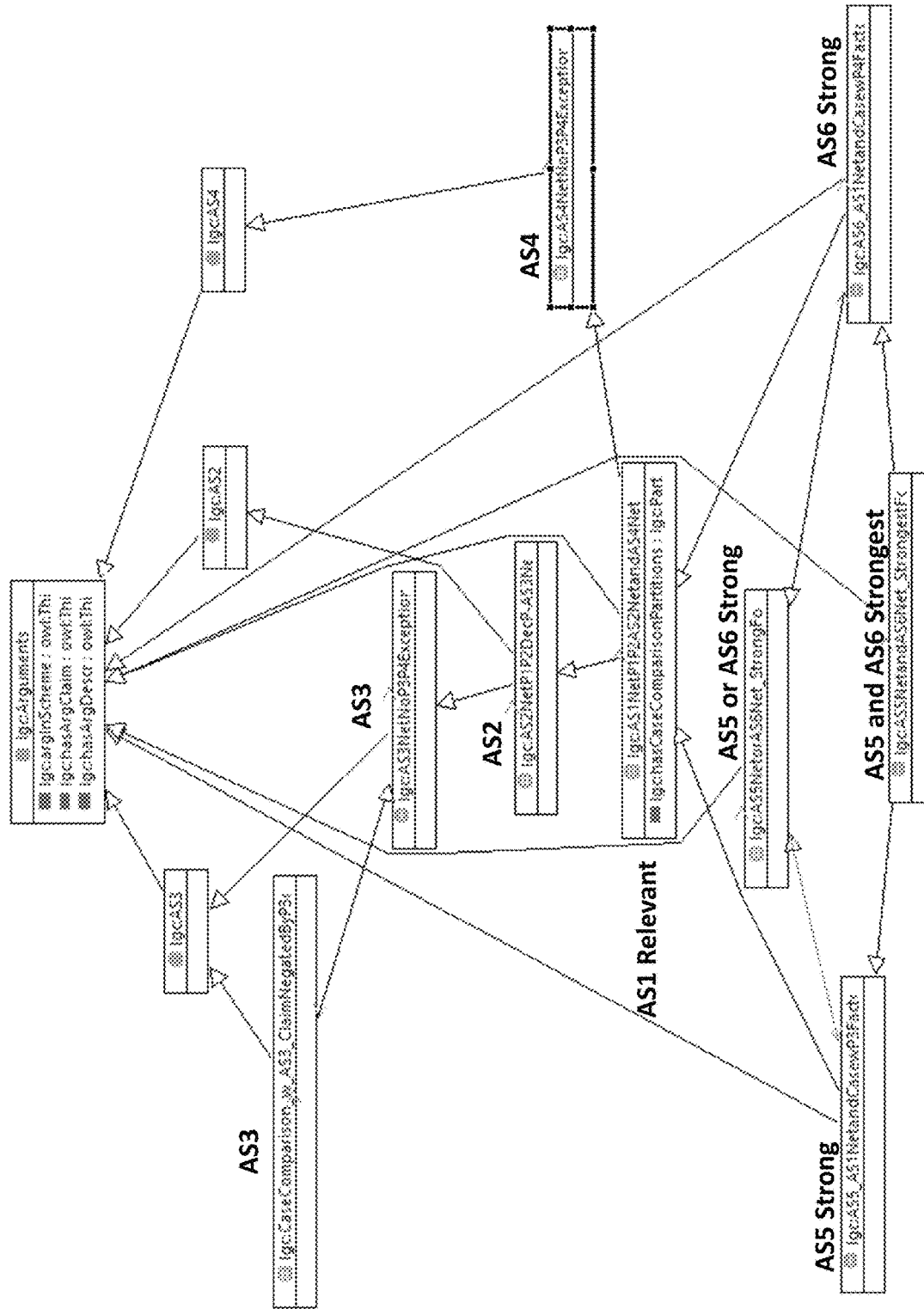
FIG. 6E is a diagram illustrating the CBR ontology pattern for an argument scheme.

FIG. 6D is a diagram illustrating the CBR ontology inferred case partition instances for another case comparison instance according to an exemplary embodiment of the invention. In particular, the case comparison between a current case "Bribe" and a past case "Reverse" is depicted. Further, CBR outcome inferences 605, 608, and 609 are also illustrated for this specific case comparisons instance. For example, factor F15 satisfies factor partition P1, thereby indicating that Bribe and Reverse have common "P" factors. Further, factor F1 satisfies factor partition P2, thereby indicating Bribe and Reverse have common "C" factors. Further, F2 satisfies factor partition P3, thereby indicating that argument AS5 (current case stronger) is satisfied. Further, F25 satisfies factor partition P4, thereby indicating that argument AS6 (past case weaker) is satisfied. However, neither of factor partitions P5 and P6 were satisfied. Accordingly, based on the above, it can be determined that the conditions associated with filters 605, 608, and 609 were satisfied. In other words, Reverse can be utilized as a "strongest past" case for current case Bribe.

FIG. 6E is a diagram illustrating an ontology class diagram of the argument scheme layer and the CBR outcome layer classes. According to an embodiment, the hierarchical reasoning in this particular CBR ontology class diagram is created by instance inferences of ontology classes that are dependent on other inferred class instances, wherein the CBR outcomes are defined as classes associated with argument reasoning which is dependent on other argument class instance inferences. Further, as depicted in the figure, the instances are all CaseComparison class 603 instances as described in FIGS. 6A2 and 6A3.

According to an embodiment, the AS3 argument class is the first case comparison argument filter executed by the CBR system. The AS3 argument class determines whether a P6 exception applies, where the past case is stronger than the current case as exemplified in the argument scheme model in FIG. 4C1. Further, if there is a P6 factor partition instance than it may be undermined by a P3 or P4 instance having a common factor parent. If there is no P6 exception or if the exception is undermined by a P3 or P4 factor instance, than this case comparison is not filtered out and proceeds to the next step of the argument scheme filter analysis with argument AS2. In particular, the argument AS2 is applied to the case comparison instances that have not been removed by the AS3 argument filter and determines (i) whether these case comparison instances have both common pro factors in partition P1 and the common con factors in partition P2 and (ii) whether the decision for the past case was biased for "P." If the above conditions are satisfied, then these case comparisons proceed to the next argument stage reasoning, i.e., AS1. Otherwise, they are filtered out from further CBR reasoning in the ontology.

According to an embodiment, AS1 determines which case comparisons satisfied argument AS2 as well as if the argument AS4 exception failed. Further, AS2 also checks whether these case comparisons satisfy the requirements for common factor instances in partition P1 and partition P2. If these conditions are satisfied, then the resulting inferred case comparison instances are classified as relevant and are passed on for further arguments reasoning by AS5 and AS6.

According to an embodiment, the AS5 argument analyzes the case comparison instances to determine whether there is a factor instance for partition P3. If there is a factor instance for P3, then this ontology class is satisfied and the case comparison instance is classified as a strong CBR outcome with the current case stronger that the precedent case. Further, the AS6 argument analyzes the case comparison instances to determine whether there is a factor instance for partition P4. If there is a factor instance for P4, then this ontology class is satisfied and the case comparison instance is classified as a strong CBR outcome with the past case weaker that the current case. According to an embodiment, if either of the AS5 or AS6 argument classes are satisfied by a case comparison instance, than the corresponding instances are classified as stronger CBR outcomes. Further, if both of AS5 and AS6 arguments are satisfied for a case comparison instance, than it is classified as strongest CBR outcomes.

FIGS. 6F1 and 6F2 are diagrams illustrating ontology patterns for the CBR case comparison factor partitions. In particular, the figure depicts the ontology class "Partition" and its relationship to the CBR ontology class "CaseComparison" via the property "hasCaseComparisonPartitions." According to an embodiment, each case comparison instance has multiple assertions of "hasCaseComparisonPartitions" to the factor instances in at least one of the partition classes P1, P2, P3, P4, P5, and P6. Further, the class "PartitionsPCDecidedForP" has subclasses P1, P2, P3, P4, P5, and P6. The CBR ontology at the Partitions layer performs reasoning to determine which factors from the two cases of an instance of CaseComparison are inferred as members of the ontology subclasses P1 through P6. In addition, in order to enable reasoning about which partitions have factor-inferred instance factors, additional subclasses have been designed for each Partition class, e.g., "P1PartitionwFactors." In addition, another subclass may be utilized to determine whether a partition has any inferred factors, e.g., class "P1NoFactor." Further, in order to support whether a factor in a partition can be undermined by certain arguments, additional subclasses have been designed to enable inferences that determine whether the factor inferred in that partition has a common mid-parent with another factor, e.g., "P3PartitionswP3P5FactorswCommMidParent." According to an embodiment, this specific class identifies whether the factor in P3 has a common mid parent factor in partition P5.

FIG. 7A is a diagram illustrating a user interface according to an exemplary embodiment of the invention. In particular, the figure depicts a user entry page 701 configured to receive user selection regarding the types of CBR outputs to display: (i) information about the case (e.g., date, decision, factors, authorities, and contested issue), (ii) information about the factors (e.g., description, bias, name, and ID), and (iii) information about the CBR outcome (e.g., CBR case classification, discriminating strong factor, discriminating weak factor, common factors, and recommended factors). Further, the page 701 also enables the user to drill down on which CBR analysis outputs to display. For example, the user may select at least one of the following options: (i) P1-P6 factor partitions, (ii) cases where there are no discriminating exceptions, (iii) cases where the exceptions were mitigated, (iv) cases with AS3 exceptions, (v) cases with AS4 exceptions, (vi) cases with no common factors, (vii) stronger past cases, (viii) weaker past cases, and (ix) stronger current case. Further, the user is also able to apply certain CBR statistical metrics: (i) cases with most common factors, (ii) distribution of case common factors, (iii) distribution of each partition P1-P6, and (iv) average and standard deviation of P1-P6 distributions.

FIG. 7B is a diagram illustrating the user interface in FIG. 7A according to another exemplary embodiment of the invention. In particular, the figure depicts a results page 702 configured to: (i) display the past case information selected with the user entry page 701 (e.g., case name, case dates, argument strength classification, strongest factors, strong factors, relevant common factors, and recommended factors) and (ii) apply additional filters to the information selected with the user entry page 701, e.g., dates ranges, comparison strength (e.g., strongest, strong, relevant, non-relevant), particular factors, and past bias outcomes (e.g., pro, con). Further, according to an embodiment, the user interface provides an ability for a user to apply "what-if" changes to a current case/situation, and discover the effects of these changes with full explanatory information about the reasons for the change in CBR reasoning results. In particular, because the CBR system has full explicit knowledge of all intermediate reasoning results about the comparison of a past case/situation with a current case/situation, the final results of its classification for use as an argument for a similar decision, and an internal model of the argument strength level for that similar decision, it may use this knowledge to recommend to the user additional specific factor(s) that would strengthen the current situation.

FIG. 7C is a diagram of an exemplary user interface providing the user with the capabilities to select Factors for a current case instance and then execute the reasoning again to observe the changes in the CBR outcomes and factor partitions for each case comparison instance for that current case. The drill down capabilities of FIG. 7B will influence the set of case comparison instances that are displayed. The "Current Case" column displays the set of current cases in the population that the user can select for a "What if" analysis. The "Case Comparison" column displays the instances of the case comparison and its corresponding CBR outcome classification, i.e., Strongest, Strong, Relevant, or Not Relevant may be displayed in separate columns. Further, any factor instances associated with the factor partitions for the particular "Current Case" instance may also be displayed in corresponding columns. Further, according to an embodiment, the factors displayed in the "Factor Selection" column and the corresponding selection boxes enable a user to modify the asserted factors for the "Current Case" by selecting or de-selecting the relevant selection box.

FIG. 7D is a diagram illustrating a user interface for supporting the entering of information to define a factor hierarchy according to an exemplary embodiment of the invention. In particular, the user interface may be utilized to define the factors in a domain related to a contested issue in a universal factor ontology (including the factor's provenance, pro/con bias, parent-child relationship, and version status). In particular, the user is able to populate a case/situation ontology with knowledge of past cases/situations with contested issues, and to link the domain factors in the populated factor ontology with the populated case/situation ontology. These ontology components are associated with specific architecture layers in the CBR architecture such that they are just sources of knowledge that can be used by the higher CBR layers to provide advice on which past situations/cases can be used to argue similar decision for a contested issue. In particular, a user can define a taxonomy and relationships between the factors for each contested issue by populating a taxonomy ontology and a factor hierarchy, respectively. According to an embodiment, the factor model may be created in response to questions on an user interface about which factors to use for a decision for a contested issue. As depicted in the figure, a user can select a "Case" instance by activating a checkbox, which allows the user to then identify a "Factor ID" by (i) selecting one of the corresponding selection check boxes or (ii) entering a "Factor ID" value if it is not provided by any of the selection boxes. Further, according to an embodiment, the selection (or entering) of the "Factor ID" will then enable the user to also (i) enter a factor label string, (ii) select its bias for P or C with a corresponding selection box, and (iii) select or enter a "Factor Parent."

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. For example, although the disclosure has been directed primarily to legal cases (e.g., Trade Secrets), it can be used in connection with other legal situations as well as non-legal situations as long as the decisions for situations are based on some common defined factor hierarchy associated with a contested issue.

The system described above can be implemented with servers and other computing devices in various configurations. The various servers and computing devices may use software to execute programs to execute the methods described above. Various embodiments of the invention also relate to the software or computer readable medium containing program instructions for executing the above described methods for automating the CBR analysis via the OWL 2 reasoning engine and the populated CBR ontology with case information, assertions for the factors for each case, and assertions for defining the Factor Hierarchy.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers and personal computers described above and in the drawings may be stored and cataloged in one or more graph servers consisting of one or more ontology knowledge bases, which may comprise or interface with a searchable knowledge base and/or a cloud knowledge base. The knowledge bases may comprise, include or a W3C standard service interface, SPARQL which W3C specification defines the syntax and semantics of the SPARQL query language for RDF. According to an embodiment, the results of SPARQL queries can be result sets or RDF graphs. The knowledge bases may comprise a single knowledge base or a collection of knowledge bases. In some embodiments, the databases may comprise a file management system, program or application for storing and maintaining data and information used or generated by the various features and functions of the systems and methods described herein.

Communications networks connect the various computing devices described above and may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript and others. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A case-based reasoning (CBR) system, the system comprising: a processor, wherein the processor is configured to:
   receive, at a user interface, selection of a current case, at least one past case, and a user selection regarding display of at least one of: (i) P1-P6 factor partitions, (ii) cases with no discriminating exceptions, (iii) cases with exceptions that were mitigated, (iv) cases with no common factors, (v) stronger past cases, (vi) weaker past cases, and (vii) stronger current case, wherein: (i) P1 identifies common factors between the current case and the at least one past that are biased for a first perspective, (ii) P2 identifies common factors between the current case and the past that are biased for a second perspective, (iii) P3 identifies unique factors in the current case, but not in the past case, biased for the first perspective, (iv) P4 identifies unique factors in the past case, but not in the current case, that are biased for the second perspective, (v) P5 identifies unique factors in the current case, not in the past case, that are biased for the second perspective, and (vi) P6 identifies unique factors in the past case, not in the current case, that are biased for the first perspective;
   compare the current case with the at least one past case based on an ontology, wherein the ontology integrates information associated with the at least one current case and the at least one past case with at least one reasoning system, wherein the comparison includes:
     determining (i) a first factor hierarchy for the current case and (ii) at least a second factor hierarchy for the at least one past case, wherein each of the first factor hierarchy and the at least second factor hierarchy includes a plurality of corresponding factors; and
     applying the at least one reasoning system to the determined first factor hierarchy and at least second factor hierarchy, a set of factor partitions that identify common and unique factors between two cases being compared, and wherein the at least one reasoning system filters out any of the at least one past cases failing to satisfy conditions associated with the at least one reasoning system; and display, with the user interface, those past cases satisfying the conditions associated with the at least one reasoning system.

2. The system of claim 1, wherein the processor is an OWL 2 web ontology language reasoning engine, and wherein the ontology is rendered using W3C direct semantics ontology theoretic standards embedded in the OWL 2 web ontology language.

3. The system of claim 1, wherein the at least one reasoning system includes a hierarchical layered architecture of reasoning ontology patterns including at least one of: domain factor hierarchy ontology pattern, case factor assertions, domain factor case comparison, domain factor permutation reasoning logic, defeasible argument reasoning, CBR case comparison overall argument model reasoning, and CBR case comparison outcome argument strength classification reasoning.

4. The system of claim 1, wherein the user interface is configured to receive user selection regarding display of at least one of: (i) additional information about the current case and the at least one past case, wherein the additional information includes at least one of case date, case decision, case factors, case authorities, and contested issue, (ii) information about the plurality of factors including at least one factor description, factor bias, factor name, and factor ID, and (iii) information about the displayed past cases including CBR case argument outcome strength classification, discriminating strong factor, discriminating weak factor, and common factors between the current case and the at least one past case.

5. The system of claim 1, wherein the user interface is configured to (i) identify and generate additional factors that would strengthen the current case in view of the displayed past cases and (ii) recommend the additional factors to the user.

6. The system of claim 1, wherein the user interface is configured to receive selection regarding display of at least one statistical metric, wherein the at least one statistical metric includes at least one of: (i) cases with most common factors, (ii) distribution of case common factors, (iii) distribution of each factor partition P1-P6, and (iv) average and standard deviation of P1-P6 distributions.

7. The system of claim 6, wherein the first and at least second factor hierarchies are generated in response to questions displayed on the user interface about which factors to use for respective contested issues in the current case and the at least one past case.

8. The system of claim 1, wherein the user interface is configured to generate the first and at least second factor hierarchies based on user input, wherein the user interface is configured to define at least one of provenance, bias, parent-child relationship, and version status of the factors in the first and at least second factor hierarchies.

9. The system of claim 8, wherein each of the first and at least second factor hierarchies include at least one mid parent factor and at least one leaf factor.

10. A case-based reasoning (CBR) method, the method comprising:
receiving, at a user interface, selection of a current case, at least one past case, and a user selection regarding display of at least one of: (i) P1-P6 factor partitions, (ii) cases with no discriminating exceptions, (iii) cases with exceptions that were mitigated, (iv) cases with no common factors, (v) stronger past cases, (vi) weaker past cases, and (vii) stronger current case, wherein: (i) P1 identifies common factors between the current case and the at least one past that are biased for a first perspective, (ii) P2 identifies common factors between the current case and the past that are biased for a second perspective, (iii) P3 identifies unique factors in the current case, but not in the past case, biased for the first perspective, (iv) P4 identifies unique factors in the past case, but not in the current case, that are biased for the second perspective, (v) P5 identifies unique factors in the current case, not in the past case, that are biased for the second perspective, and (vi) P6 identifies unique factors in the past case, not in the current case, that are biased for the first perspective;
comparing the current case with the at least one past case based on an ontology, wherein the ontology integrates information associated with the at least one current case and the at least one past case with at least one reasoning system, wherein the comparison includes:
determining (i) a first factor hierarchy for the current case and (ii) at least a second factor hierarchy for the at least one past case, wherein each of the first factor hierarchy and the at least second factor hierarchy includes a plurality of corresponding factors; and
applying the at least one reasoning system to the determined first factor hierarchy and at least second factor hierarchy, wherein the at least one reasoning system filters out any of the at least one precedent cases failing to satisfy conditions associated with the at least one reasoning system; and
displaying, with the user interface, those past cases satisfying the conditions associated with the at least one reasoning system.

11. The method of claim 10, wherein the ontology is based on W3C direct semantics ontology theoretic standards rendered using the OWL 2 web ontology language.

12. The method of claim 10, wherein the at least one reasoning system includes at least one of: domain factor case comparison permutation logic, defeasible reasoning, defeasible argument reasoning, CBR case comparison overall argument model reasoning, and CBR case comparison outcome strength classification reasoning.

13. The method of claim 10, wherein the user interface is configured to (i) generate additional factors that would strengthen the current case in view of the displayed past cases and (ii) recommend the additional factors to the user.

14. The method of claim 10, wherein the user interface is configured to generate the first and at least second factor hierarchies based on user input, wherein the user interface is configured to define at least one of provenance, bias, parent-child relationship, and version status of the factors in the first and at least second factor hierarchies.

15. The method of claim 14, wherein the first and at least second factor hierarchies are generated in response to questions displayed on the user interface about which factors to use for respective contested issues in the current case and the at least one past case.

16. The method of claim 15, wherein each of the first and at least second factor hierarchies include at least one mid parent factor and at least one leaf factor.

17. A case-based reasoning (CBR) system, the system comprising:
at least one server, wherein the at least one server is configured to store (i) a plurality of current and past cases and (ii) at least one reasoning system;
a client device including a user interface, wherein the user interface is configured to receive selection of a current case, at least one past case of the plurality of current and past cases, and a user selection regarding display of at least one of: (i) P1-P6 factor partitions, (ii) cases with no discriminating exceptions, (iii) cases with exceptions that were mitigated, (iv) cases with no common factors, (v) stronger past cases, (vi) weaker past cases, and (vii) stronger current case, wherein: (i) P1 identifies common factors between the current case and the at least one past that are biased for a first perspective, (ii) P2 identifies common factors between the current case and the past that are biased for a second perspective, (iii) P3 identifies unique factors in the current case, but not in the past case, biased for the first perspective, (iv) P4 identifies unique factors in the past case, but not in the current case, that are biased for the second perspective, (v) P5 identifies unique factors in the current case, not in the past case, that are biased for the second perspective, and (vi) P6 identifies unique factors in the past case, not in the current case, that are biased for the first perspective; and a processor, wherein the processor is configured to:
compare the current case with the at least one past case based on an ontology, wherein the ontology integrates information associated with the at least one current case and the at least one past case with the at least one reasoning system, wherein the comparison includes:

determining (i) a first factor hierarchy for the current case and (ii) at least a second factor hierarchy for the at least one past case, wherein each of the first factor hierarchy and the at least second factor hierarchy includes a plurality of corresponding factors; and applying the at least one reasoning system to the determined first factor hierarchy and at least second factor hierarchy, wherein the at least one reasoning system filters out any of the at least one past cases failing to satisfy conditions associated with the at least one reasoning system; and display, with the user interface, those past cases satisfying the conditions associated with the at least one reasoning system.

18. The system of claim 17, wherein the processor is an OWL 2 web ontology language reasoning engine, and wherein the ontology is based on W3C direct semantics ontology theoretic standards embedded in the OWL 2 web ontology language.

* * * * *